US009425666B2

United States Patent
Ishigami et al.

(10) Patent No.: US 9,425,666 B2
(45) Date of Patent: Aug. 23, 2016

(54) STATOR AND ROTATING ELECTRIC MACHINE

(75) Inventors: Takashi Ishigami, Tokyo (JP); Yutaka Matsunobu, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 363 days.

(21) Appl. No.: 14/111,483

(22) PCT Filed: Apr. 13, 2012

(86) PCT No.: PCT/JP2012/060116
§ 371 (c)(1),
(2), (4) Date: Nov. 4, 2013

(87) PCT Pub. No.: WO2012/141286
PCT Pub. Date: Oct. 18, 2012

(65) Prior Publication Data
US 2014/0042862 A1 Feb. 13, 2014

(30) Foreign Application Priority Data

Apr. 13, 2011 (JP) .................. 2011-089191

(51) Int. Cl.
*H02K 3/00* (2006.01)
*H02K 3/04* (2006.01)
(Continued)

(52) U.S. Cl.
CPC .. *H02K 3/48* (2013.01); *H02K 3/12* (2013.01); *H02K 3/14* (2013.01); *H02K 3/28* (2013.01); *H02K 15/063* (2013.01); *H02K 15/066* (2013.01)

(58) Field of Classification Search
CPC ............ H02K 3/21; H02K 15/14; H02K 1/00

USPC ................. 310/187, 198, 201, 203, 207, 208; 29/596

See application file for complete search history.

(56) References Cited

U.S. PATENT DOCUMENTS 6,455,971 B1 * 9/2002 Palma, Sr. ................ H02K 3/12
310/180
6,979,926 B2 * 12/2005 Ogawa ..................... H02K 3/12
310/179

(Continued)

FOREIGN PATENT DOCUMENTS

JP 4-289744 A 10/1992
JP 2004-537247 A 12/2004

(Continued)

OTHER PUBLICATIONS

Corresponding International Search Report with English Translation dated Jul. 10, 2012 (three (3) pages).

*Primary Examiner* — Jose Gonzalez Quinones
(74) *Attorney, Agent, or Firm* — Crowell & Moring LLP

(57) ABSTRACT

A stator includes: a stator core with N pieces of slots ranging along an axial direction, which are formed side-by-side along a circumferential direction; and a stator winding installed in the slots at the stator winding. The stator winding includes a plurality of winding groups, each made up with N pieces of lap-wound coils each formed by winding a conductor wire a plurality of times. The winding groups are disposed in a plurality of layers set side-by-side along a radial direction at the stator core. One coil side at each of the lap-wound coils is inserted in a specific slot on an inner side along the radial direction in a specific layer and another coil side of the lap-wound coil is inserted in another slot on an outer side along the radial direction in the specific layer.

10 Claims, 20 Drawing Sheets

Figure 1:
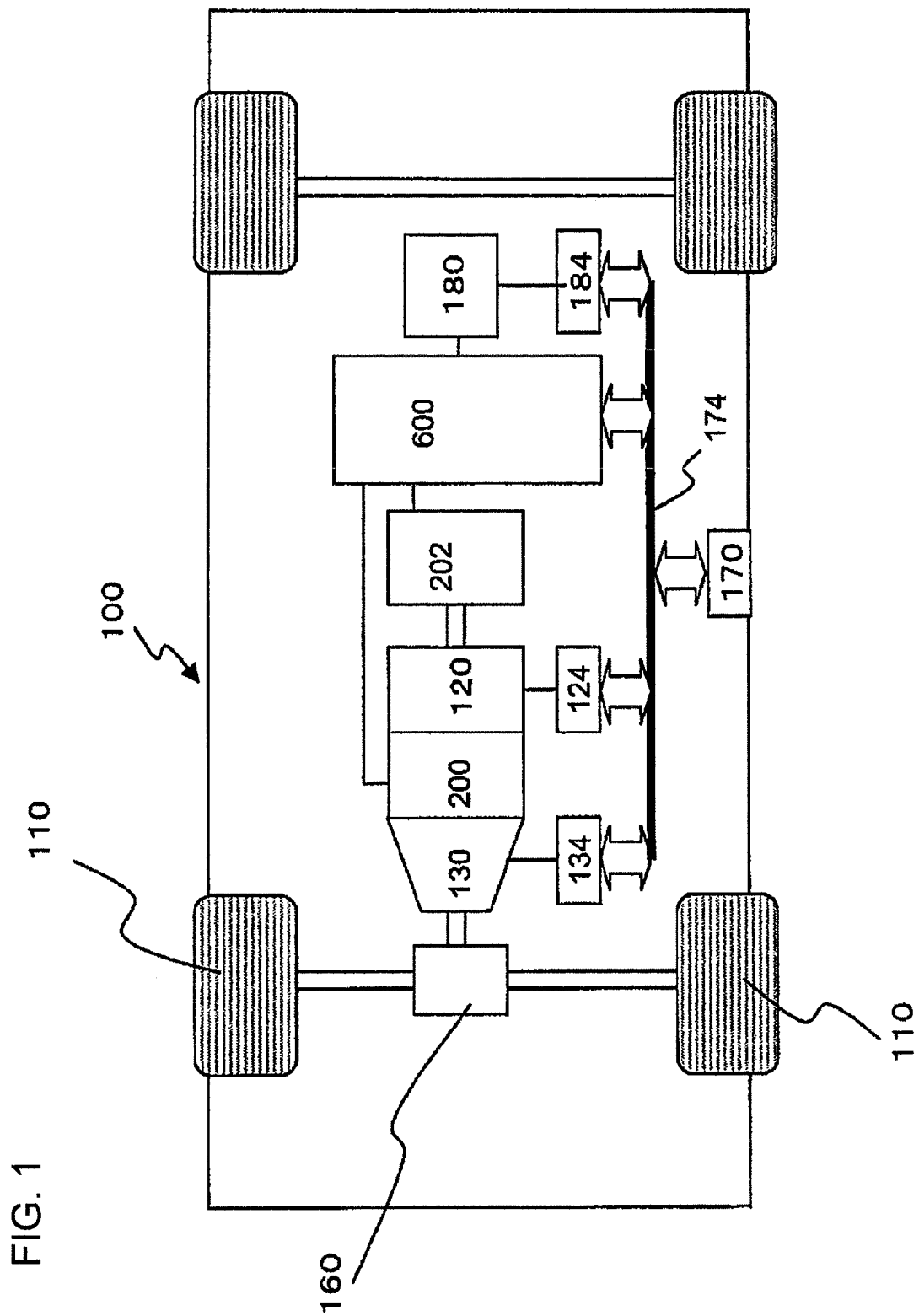

(51) Int. Cl.
*H02K 3/48* (2006.01)
*H02K 3/12* (2006.01)
*H02K 3/14* (2006.01)
*H02K 3/28* (2006.01)
*H02K 15/06* (2006.01)

(56) References Cited

U.S. PATENT DOCUMENTS 7,825,562 B2 11/2010 Naganawa et al.
2005/0042097 A1 2/2005 Wobben
2008/0093948 A1* 4/2008 Naganawa ........... H02K 15/045 310/203
2008/0136274 A1* 6/2008 Fujii ..................... H02K 3/12 310/71
2010/0026132 A1* 2/2010 Ooiwa .................. H02K 3/12 310/201
2011/0000078 A1 1/2011 Gorohata et al.

FOREIGN PATENT DOCUMENTS

JP 2008-104293 A 5/2008
JP 2009-247199 A 10/2009

* cited by examiner

STATOR AND ROTATING ELECTRIC MACHINE

TECHNICAL FIELD

The present invention relates to a stator in a rotating electric machine.

BACKGROUND ART

In a rotating electric machine proposed in the related art that includes a distributed-winding stator having coils formed by lap-winding a conductor wire with a rectangular section, crowning portions are formed in a crank shape at the two ends of each lap-wound coil with an offset to an extent equivalent to the full width of the lapped conductor wire (see patent literature 1).

CITATION LIST

Patent Literature

Patent literature 1: Japanese Laid Open Patent Publication No. 2008-104293

SUMMARY OF INVENTION

Technical Problem

The stator disclosed in patent literature 1 does not successfully address an issue in that an increase in the number of turns with which the conductor wire constituting the lap-wound coils is wound, causes an increase in the bending radius at the crowning portions of the lap-wound coils, and inevitably bulks up the coil ends.

Solution to Problem

A stator according to a first aspect of the present invention comprises: a stator core with N pieces of slots ranging along an axial direction, which are formed side-by-side along a circumferential direction; and a stator winding installed in the slots at the stator winding, wherein: the stator winding includes a plurality of winding groups, each made up with N pieces of lap-wound coils each formed by winding a conductor wire a plurality of times; the winding groups are disposed in a plurality of layers set side-by-side along a radial direction at the stator core; and one coil side at each of the lap-wound coils is inserted in a specific slot on an inner side along the radial direction in a specific layer and another coil side of the lap-wound coil is inserted in another slot on an outer side along the radial direction in the specific layer.

According to a second aspect of the present invention, in the stator according to the first aspect, it is preferable that a sectional area of coil sides in the lap-wound coils disposed in a specific layer at the stator core is different from a sectional area of coil sides in the lap-wound coils disposed in another layer different from the specific layer at the stator core.

According to a third aspect of the present invention, in the stator according to the first or second aspect it is preferable that a number of turns with which the conductor wire forming the coil sides in the lap-wound coils disposed in the specific layer at the stator core is wound is different from a number of turns with which the conductor wire forming the coil sides in the lap-wound coils disposed in another layer different from the specific layer at the stator core is wound.

According to a fourth aspect of the present invention, in the stator according to the first or second aspect, it is preferable that a sectional area of the conductor wire forming the coil sides in the lap-wound coils disposed in the specific layer at the stator core is different from a sectional area of the conductor wire forming the coil sides in the lap-wound coils disposed in another layer different from the specific layer at the stator core.

According to a fifth aspect of the present invention, in the stator according to the third aspect, it is preferable that the conductor wire assumes a uniform sectional area.

According to a sixth aspect of the present invention, in the stator according to the fourth aspect, it is preferable that the conductor wire is wound with a uniform number of turns.

According to a seventh aspect of the present invention, in the stator according to any one of the first through sixth aspects, it is preferable that a sectional area of the coil sides in the lap-wound coils disposed in an outer circumferential side layer at the stator core is larger than a sectional area of coil sides in the lap-wound coils disposed in an inner circumferential side layer at the stator core.

According to an eighth aspect of the present invention, in the stator according to any one of the first through seventh aspects, it is preferable that the stator winding is installed at the stator core so that a phase of the lap-wound coils disposed in an inner circumferential side layer at the stator core is offset along the circumferential direction by an extent equivalent to one slot or more relative to the phase of the lap-wound coils disposed in an outer circumferential side layer at the stator core.

A rotating electric machine according to a ninth aspect of the present invention comprises: the stator according to any one of the first through eighth aspects; and a rotor rotatably disposed on an inner circumferential side of the stator with a gap setting the rotor apart from the stator, wherein: the rotating electric machine is driven with three-phase AC power.

According to a tenth aspect of the present invention, in the rotating electric machine according to the ninth aspect, it is preferable that when the winding groups, each corresponding to different phases, are made up with n pieces of coil windings Ui, n pieces of coil windings Vi and n pieces of coil windings Wi (i=1~n), a total of the plurality of layers is n and the plurality of winding groups are notated as Lj (j=1~n), n pieces of winding groups Lj, each made up with a coil winding Ui, a coil winding Vi and a core winding Wi, are wound over the n layers, starting from an inner circumferential side toward an outer circumferential side at the stator core.

According to an eleventh aspect of the present invention, in the rotating electric machine according to the tenth aspect, it is preferable that N pieces of slots, each ranging along the axial direction, are formed side-by-side along the circumferential direction at the stator core; the coil windings are each made up with N/n pieces of lap-wound coils, each formed by winding a conductor wire a plurality of times; and one coil side of each lap-wound coil in a coil winding among the coil windings corresponding to the different phases in each winding group is inserted in a specific slot further inside along the radial direction in a specific layer and another coil side of the lap-wound coil is inserted in another slot further outside along the radial direction in the specific layer.

Advantageous Effect of the Invention

The present invention makes it possible to provide a stator with smaller coil ends and a more compact rotating electric machine.

BRIEF DESCRIPTION OF THE DRAWINGS (FIG. 1) A schematic illustration showing the structure of a hybrid electric vehicle equipped with a rotating electric machine that includes the stator achieved in an embodiment of the present invention (FIG. 2) A circuit diagram pertaining to the power conversion device in FIG. 1

Figure 8:
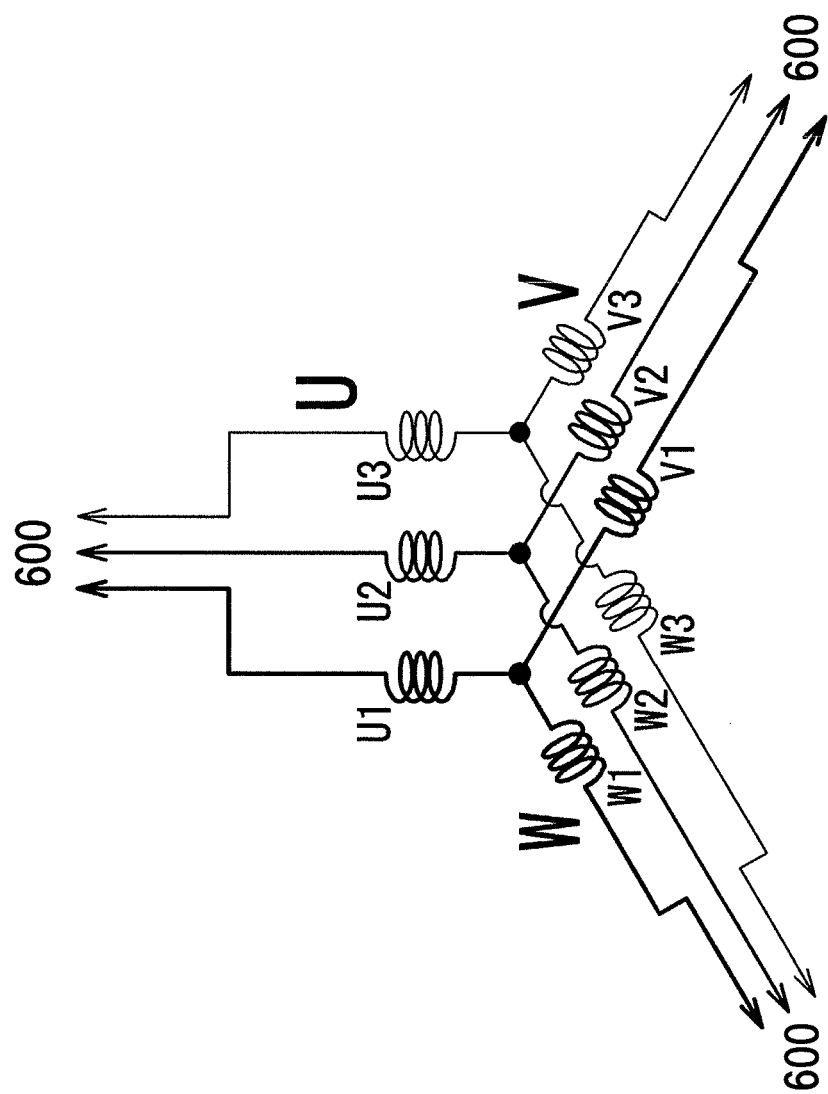
Figure 9:
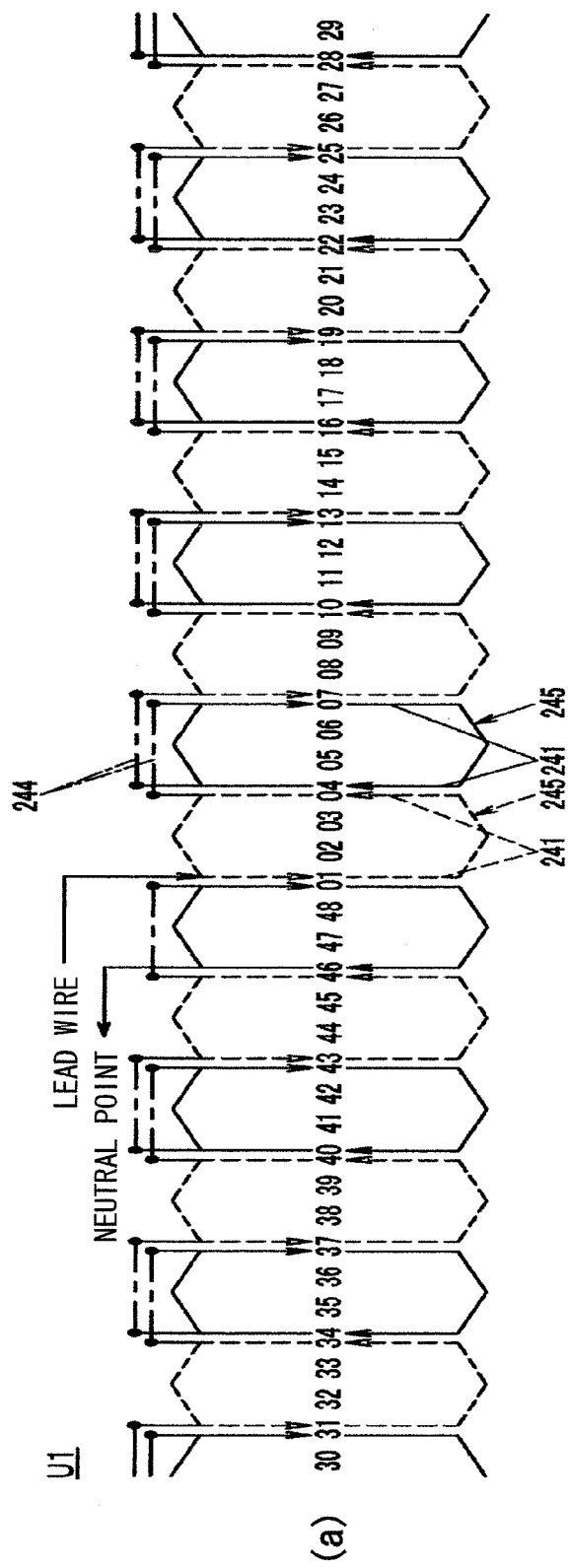
Figure 9:
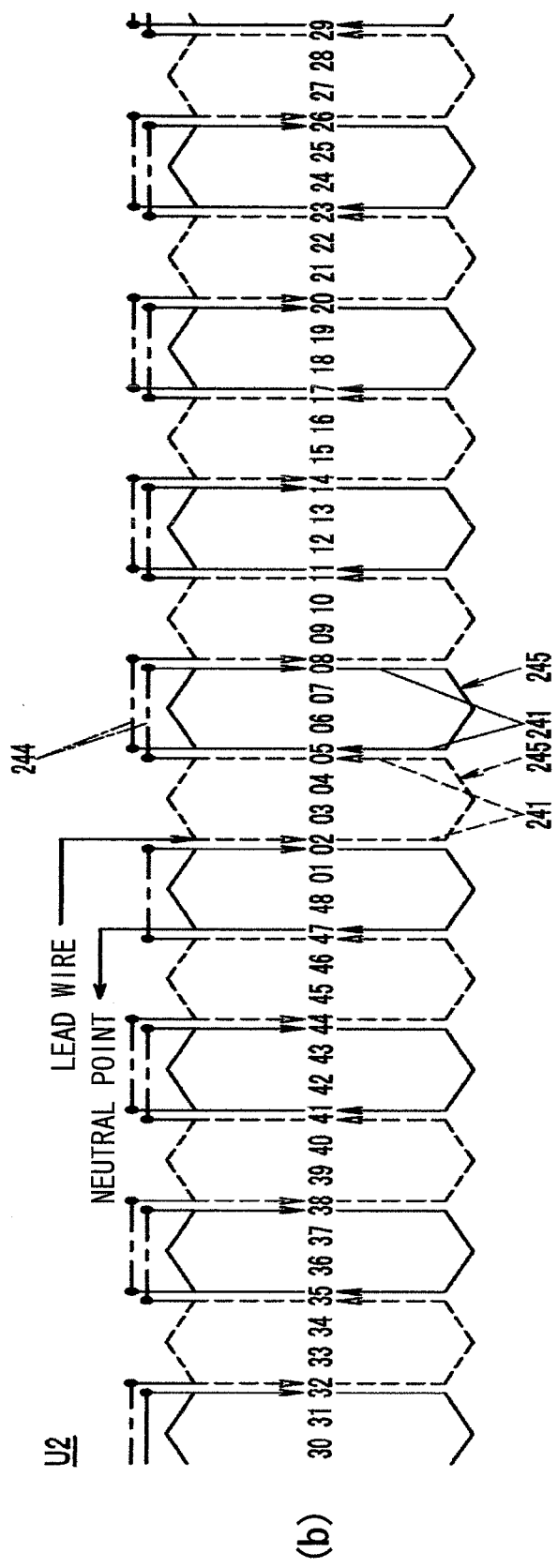
Figure 9:
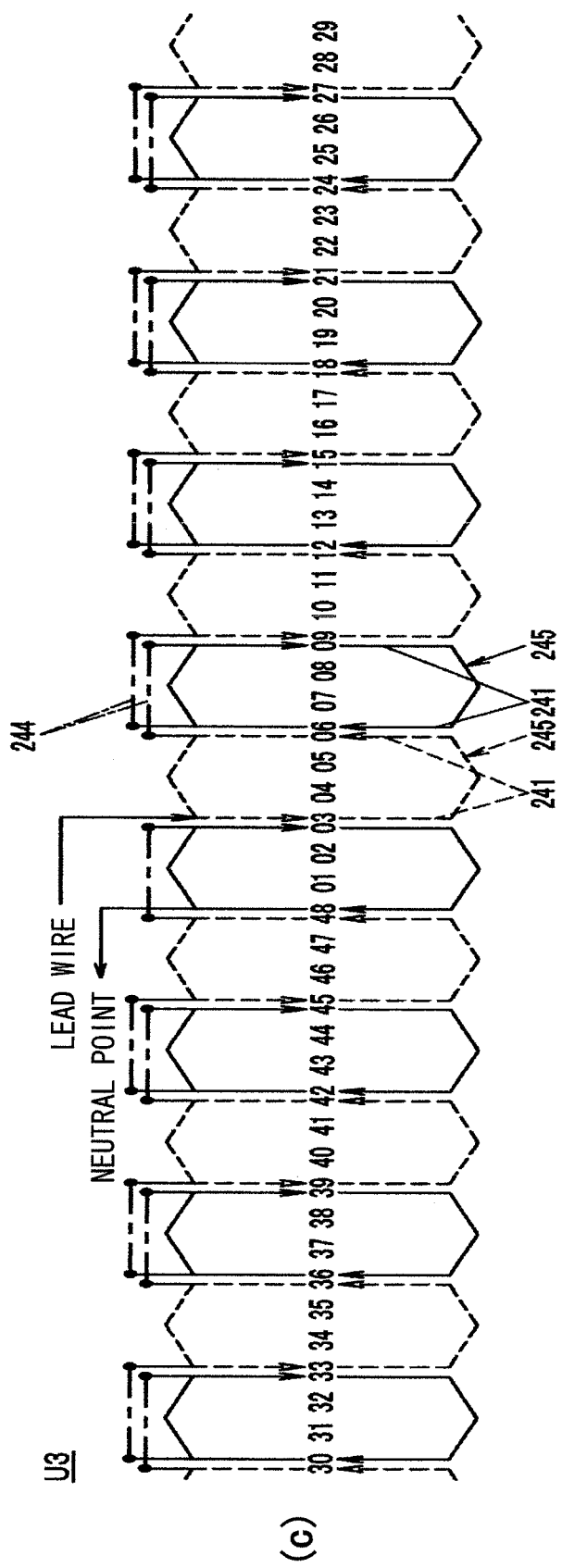

(FIG. 3) A sectional view of the rotating electric machine achieved in the embodiment of the present invention (FIG. 4) A sectional view of the stator core achieved in the embodiment of the present invention (FIG. 5) A perspective presenting an external view of the stator achieved in the embodiment of the present invention (FIG. 6) A perspective presenting an external view of the lap-wound coils and the stator core achieved in the embodiment of the present invention (FIG. 7) An illustration of the stator winding installed at the stator core (FIG. 8) A connection diagram illustrating how the stator winding is wired (FIG. 9) A detailed connection diagram illustrating how the U-phase winding is wired (FIG. 10) A detailed illustration of slots assigned with slot numbers 01 through 13 in FIG. 9

(FIG. 11) A diagram illustrating the positions of the coil sides in the various phase windings (FIG. 12) A connection diagram illustrating how the first winding group is wired (FIG. 13) An enlarged view of the coil sides belonging to the coils inserted in a given slot at the stator achieved in the embodiment of the present invention (FIG. 14) An illustration showing how the stator winding is inserted by using a forming jig (FIG. 15) An enlarged schematic view of a crowning portion at a coil end of a stator winding in an example of the related art presented in (a), and an enlarged schematic view of the crowning portions at a coil end of the stator winding achieved in the embodiment of the present invention presented in (b)

(FIG. 16) A diagram of induced voltage waveforms (FIG. 17) An enlarged view of the coil sides belonging to the coils inserted in a given slot at a stator achieved in a variation of the present invention (FIG. 18) An enlarged view of the coil sides belonging to the coils inserted in a given slot at a stator achieved in a variation of the present invention

DESCRIPTION OF EMBODIMENT

The following is a description of an embodiment of the stator according to the present invention and a rotating electric machine equipped with this stator, given in reference to drawings.

The rotating electric machine achieved in the embodiment, which can be engaged in an ideal manner in a traveling operation of an electric vehicle or a hybrid electric vehicle, may be an induction motor equipped with a squirrel cage rotor or a synchronous motor equipped with a rotor that includes permanent magnets. The following description will be given by assuming that the present invention is embodied in a synchronous motor used in a hybrid electric vehicle.

FIG. 1 provides a schematic illustration of the structure adopted in a hybrid electric vehicle having the rotating electric machine achieved in the embodiment of the present invention installed therein.

An engine 120, a first rotating electric machine 200, a second rotating electric machine 202 and a battery 180 are mounted at a hybrid electric vehicle (hereafter referred to as a vehicle) 100, as shown in FIG. 1.

The battery 180, constituted with secondary battery cells such as lithium ion battery cells or nickel hydride battery cells or capacitors, is capable of outputting high-voltage DC power in a range of 250 to 600 v or higher. The battery 180 provides DC power to the rotating electric machines 200 and 202 during power running operation, whereas it receives DC power from the rotating electric machines 200 and 202 during a regenerative traveling operation. The battery 180 and the rotating electric machines 200 and 202 exchange DC power via a power conversion device 600.

A battery (not shown) that provides low-voltage power (e.g., 14 v power) installed in the vehicle supplies DC power to the control circuits to be described below.

Rotational torque generated via the engine 120 and the rotating electric machines 200 and 202 is transmitted to front wheels 110 via a transmission 130 and a differential gear unit 160. The transmission 130 is controlled by a transmission control device 134, whereas the engine 120 is controlled by an engine control device 124. The battery 180 is controlled by a battery control device 184.

The transmission control device 134, the engine control device 124, the battery control device 184, and the power conversion device 600 are connected with an integrated control device 170 via a communication line 174.

The integrated control device 170, receives information indicating statuses at the transmission control device 134, the engine control device 124, the power conversion device 600 and the battery control device 184 individually from the respective control devices via the communication line 174. Based upon the information thus received, the integrated control device 170 generates through arithmetic operation a control command for each corresponding control device and the control command generated through the arithmetic operation is then transmitted to the particular control device via the communication line 174.

The battery control device 184 outputs, via the communication line 174, information indicating the state of charge/discharge in the battery 180 and the states of the individual battery cell units constituting the battery 180 to the integrated control device 170.

Upon determining, based upon the information provided by the battery control device 184, that the battery 180 needs to be charged, the integrated control device 170 issues an instruction for power generation operation to the power conversion device 600.

The functions of the integrated control device 170 further include management of torque output from the engine 120 and the rotating electric machines 200 and 202, arithmetic processing executed to calculate the overall torque representing the sum of the torque output from the engine 120 and the torques output from the rotating electric machines 200 and 202, and a torque distribution ratio, and transmission of control commands generated based upon the arithmetic processing results to the transmission control device 134, the engine control device 124 and the power conversion device 600.

Based upon a torque command issued by the integrated control device 170, the power conversion device 600 controls the rotating electric machines 200 and 202 so as to output torque or generate power as indicated in the command. The power conversion device 600 includes power semiconductor elements that constitute inverters. The power conversion device 600 controls switching operation of the power semiconductor elements based upon a command issued by the integrated control device 170. As the power semiconductor elements are engaged in the switching operation, the rotating electric machines 200 and 202 are each driven to operate as an electric motor or a power generator.

When engaging the rotating electric machines 200 and 202 in operation as electric motors, DC power provided from the high-voltage battery 180 is supplied to DC terminals of the inverters in the power conversion device 600. The power conversion device 600 controls the switching operation of the power semiconductor elements so as to convert the DC power supplied to the inverters to three-phase AC power and provides the three-phase AC power to the rotating electric machines 200 and 202.

When engaging the rotating electric machines 200 and 202 in operation as generators, each rotor is rotationally driven with a rotational torque applied thereto from the outside and thus, three-phase AC power is generated at the corresponding stator winding. The three-phase AC power thus generated is converted to DC power in the power conversion device 600 and the high-voltage battery 180 is charged with the DC power supplied thereto.

(Power Conversion Device)

Figure 2:
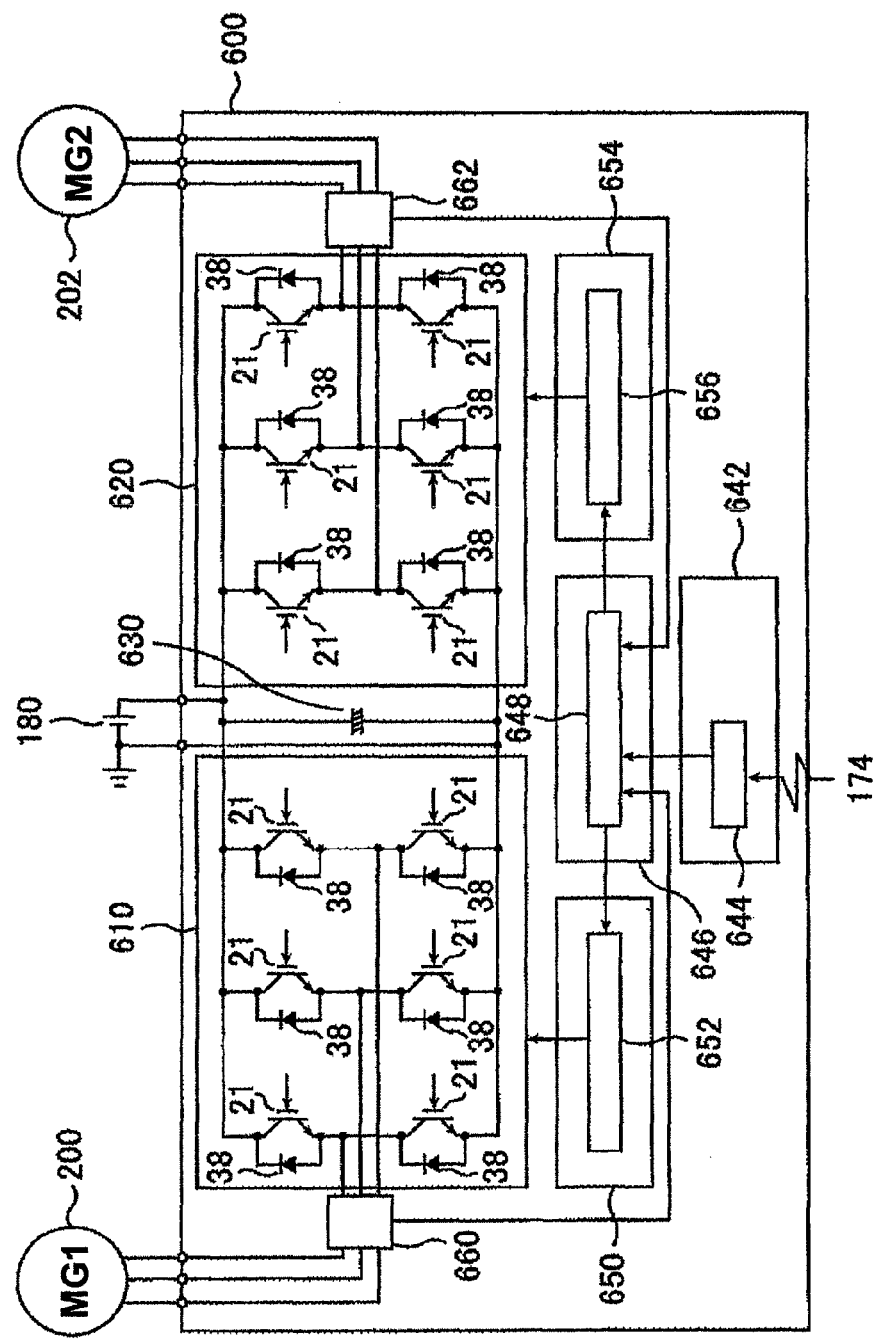

FIG. 2 is a circuit diagram pertaining to the power conversion device 600 in FIG. 1. The power conversion device 600 includes a first inverter device for the first rotating electric machine 200 and a second inverter device for the second rotating electric machine 202. The first inverter device comprises a power module 610, a first drive circuit 652 that controls switching operation of power semiconductor elements 21 in the power module 610 and a current sensor 660 that detects an electric current at the rotating electric machine 200. The drive circuit 652 is configured on a drive circuit substrate 650.

The second inverter device comprises a power module 620, a second drive circuit 656 that controls switching operation of power semiconductor elements 21 in the power module 620 and a current sensor 662 that detects an electric current at the rotating electric machine 202. The drive circuit 656 is configured on a drive circuit substrate 654.

A control circuit 648 configured on a control circuit substrate 646, a capacitor module 630 and a transmission/reception circuit 644 mounted on a connector substrate 642 are common circuits serving both the first inverter device and the second inverter device.

The power modules 610 and 620 are respectively engaged in operation in response to drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating electric machine 200 or 202. The power modules 610 and 620 also convert AC power induced at the stator windings of the rotating electric machines 200 and 202 to DC power and provide the DC power resulting from the conversion to the high-voltage battery 180.

As indicated in FIG. 2, the power modules 610 and 620 each include a three-phase bridge circuit constituted with serial circuits each corresponding to one of the three phases, electrically connected in parallel between the positive pole side and the negative pole side of the battery 180. Each serial circuit includes a power semiconductor element 21 constituting an upper arm and a power semiconductor element 21 constituting a lower arm, and these power semiconductor elements 21 are connected in series.

Since the power module 610 and the power module 620 adopt circuit structures substantially identical to each other, as illustrated in the figure, the following description focuses on the power module 610 chosen as a representative example.

The switching power semiconductor elements used in the embodiment are IGBTs (insulated gate bipolar transistors). An IGBT includes three electrodes; a collector electrode, an emitter electrode and a gate electrode. A diode 38 is electrically connected between the collector electrode and the emitter electrode of the IGBT. The diode 38 includes two electrodes; a cathode electrode and an anode electrode, with the cathode electrode electrically connected to the collector electrode of the IGBT and the anode electrode electrically connected to the emitter electrode of the IGBT so as to define the direction running from the emitter electrode toward the collector electrode at the IGBT as a forward direction.

The upper and lower arms in the serial circuit corresponding to a given phase are configured by electrically connecting the emitter electrode of one IGBT and the collector electrode of another IGBT in series. It is to be noted that while FIG. 2 shows the upper arm and the lower arm corresponding to a given phase each constituted with a single IGBT, a large current control capacity needs to be assured in practical use and thus, a plurality of IGBTs are connected in parallel to constitute an upper arm or a lower arm in reality.

The collector electrode of the IGBT constituting the upper arm in a given phase is electrically connected to the positive pole side of the battery 180, whereas the emitter electrode of the IGBT constituting the lower arm in a given phase is electrically connected to the negative pole side of the battery 180. A middle point between the arms corresponding to each phase (an area where the emitter electrode of the upper arm-side IGBT and the collector electrode of the lower arm-side IGBT are connected) is electrically connected to the armature winding (stator winding) of the corresponding phase at the corresponding rotating electric machine 200 or 202.

The drive circuits 652 and 656, constituting drive units via which the power modules 610 and 620 in the corresponding inverter devices are controlled, generate drive signals used to drive the IGBTs based upon a control signal output from the control circuit 648. The drive signals generated at the individual drive circuits 652 and 656 are respectively output to the gates of the various power semiconductor elements 21 in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter devices, is constituted with a microcomputer that generates, through arithmetic operation, a control signal (control value) based upon which the plurality of switching power semiconductor elements 21 are engaged in operation (turned on/off). A torque command signal (torque command value) provided from the integrated control device 170, sensor outputs from the current sensors 660 and 662, and sensor outputs from rotation sensors (not shown) mounted at the rotating electric machines 200 and 202 are input to the control circuit 648. Based upon these signals input thereto, the control circuit 648 calculates control values and outputs control signals to the drive circuits 652 and 656 so as to control the switching timing.

The transmission/reception circuit 644 mounted at the connector substrate 642, which electrically connects the power conversion device 600 with an external control device, is engaged in information exchange with another device via the communication line 174 shown in FIG. 1.

The capacitor module 630, constituting a smoothing circuit via which the extent of DC voltage fluctuation occurring as the power semiconductor elements 21 are engaged in switching operation is reduced, is electrically connected in parallel with DC-side terminals of the power modules 610 and 620.

(Structure of Rotating Electric Machine)

The structure adopted in the rotating electric machines 200 and 202 will be described next. Since the structure of the first rotating electric machine 200 is substantially identical to that of the second rotating electric machine 202, the following description focuses on the structure adopted in the first rotating electric machine 200, as a representative example. It is to be noted that the structural features described below do not need to be adopted in both rotating electric machines 200 and 202, as long as they are adopted in at least one of them.

Figure 3:
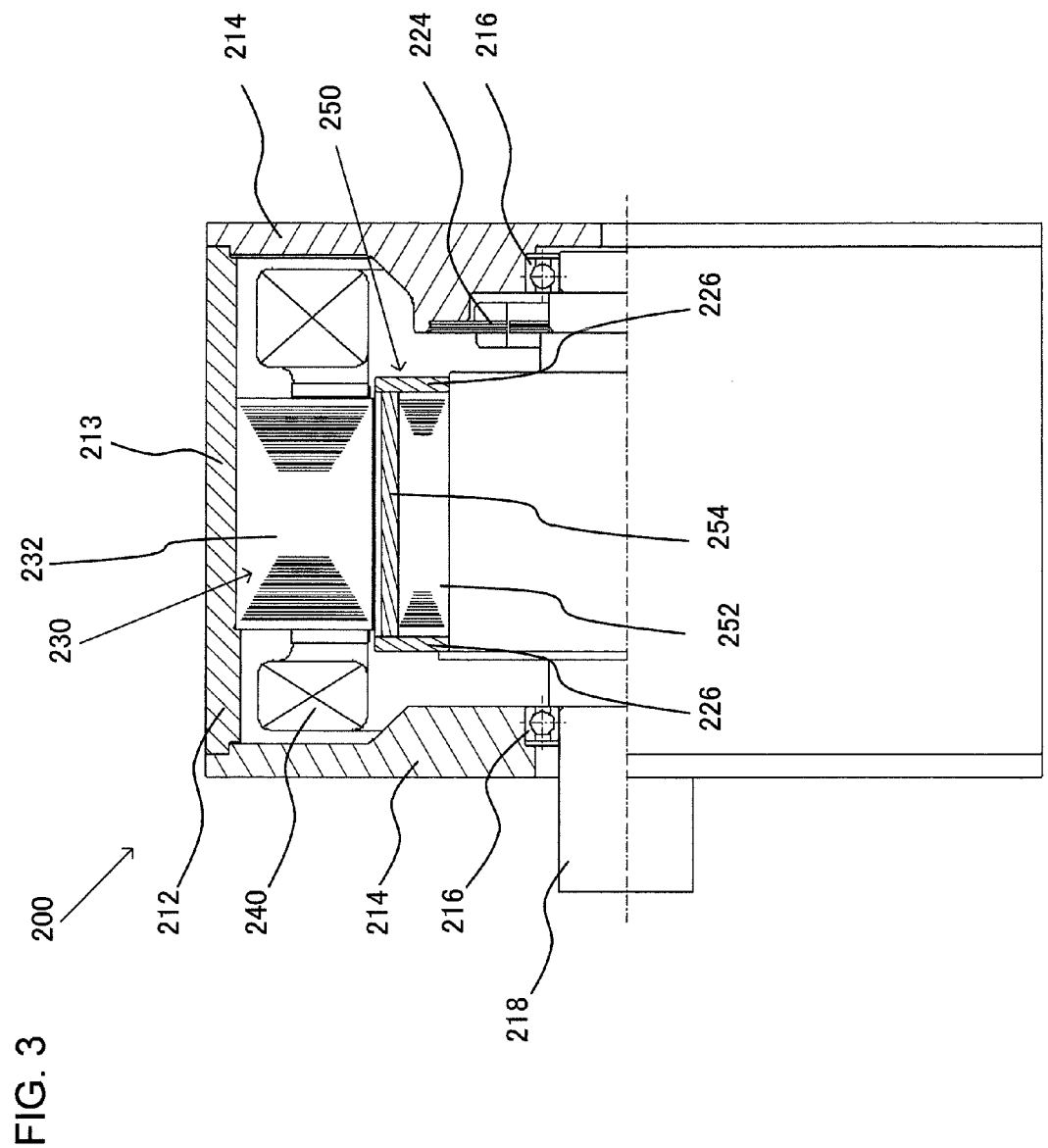

FIG. 3 is a sectional view of the rotating electric machine 200. The rotating electric machine 200 comprises a stator 230 held inside a housing 212 and a rotor 250 rotatably disposed on the inner circumferential side of the stator 230 with a clearance setting it apart from the stator 230. The housing 212 is configured with a pair of end brackets 214 at which bearings 216 are disposed and a center bracket 213 assuming the shape of a circular cylinder.

(Rotor)

The rotor 250 includes a rotor core 252, permanent magnets 254 and nonmagnetic contact plates 226. A shaft 218 is attached to the rotor core 252 so as to be allowed to rotate as one with the rotor core 252. The shaft 218 is rotatably held by the bearings 216 disposed at the end brackets 214.

A resolver 224, which detects the positions of the poles at the rotor 250 and the rotation speed of the rotor 250, is disposed at the shaft 218. An output from the resolver 224 is input to the control circuit 648 shown in FIG. 2. The control circuit 248 outputs a control signal, generated based upon the output from the resolver 224, to the drive circuit 652. The drive circuit 652, in turn, outputs a drive signal, generated based upon the control signal, to the power module 610. At the power module 610, switching operation is executed based upon the control signal so as to convert, for instance, DC power, provided from the battery 180, to three-phase AC power, as described earlier. This three-phase AC power is provided to a stator winding 240 shown in FIG. 3 and, as a result, a rotating magnetic field is generated at the stator 230. The frequency of the three-phase AC currents is controlled based upon an output value provided by the resolver 224 and the phases of the three-phase AC currents relative to the rotor 250 are also controlled based upon the output value provided by the resolver 224.

Rectangular permanent magnets 254 are disposed over equal intervals along the circumferential direction near the outer circumference of the rotor core 252. The permanent magnets 254 function as field poles of the rotor 250 and the rotor in the embodiment assumes a 16-pole structure. As a rotating magnetic field is induced at the stator 230 by the three-phase AC currents flowing through the stator winding 240, torque is generated with the rotating magnetic field acting on the permanent magnets 254 at the rotor 250.

(Stator)

Figure 4:
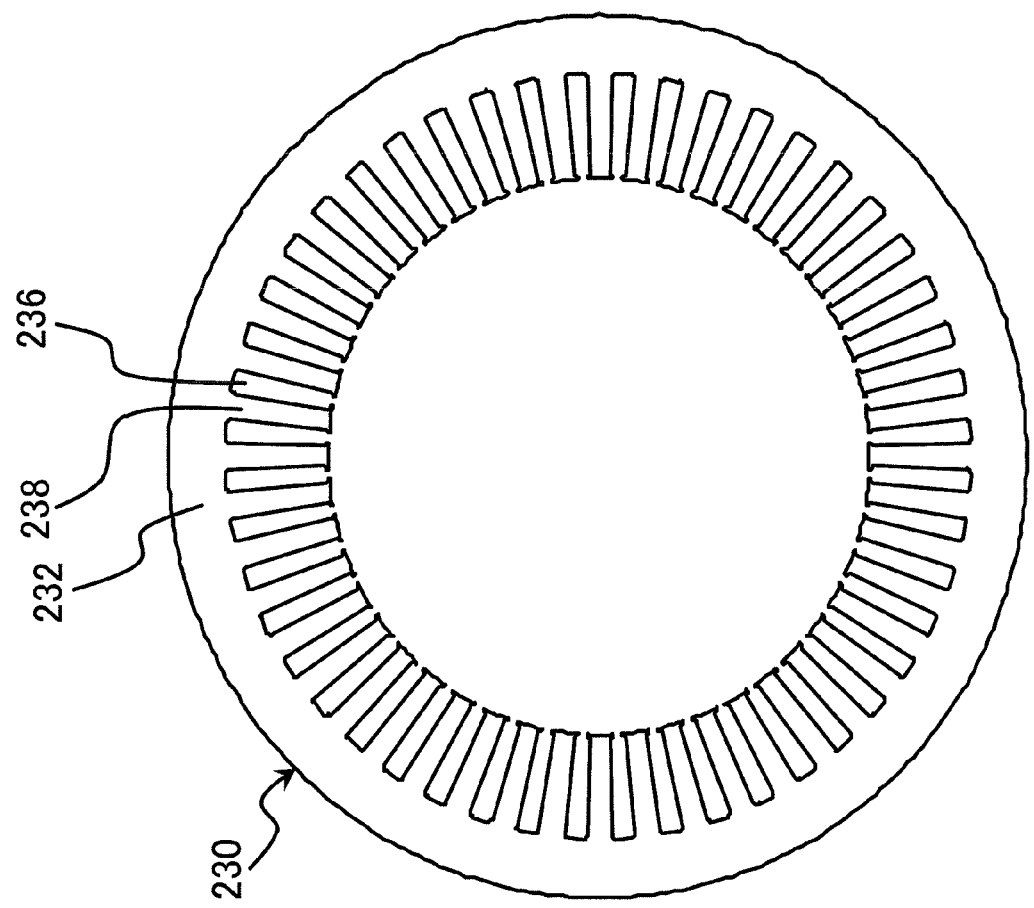
Figure 5:
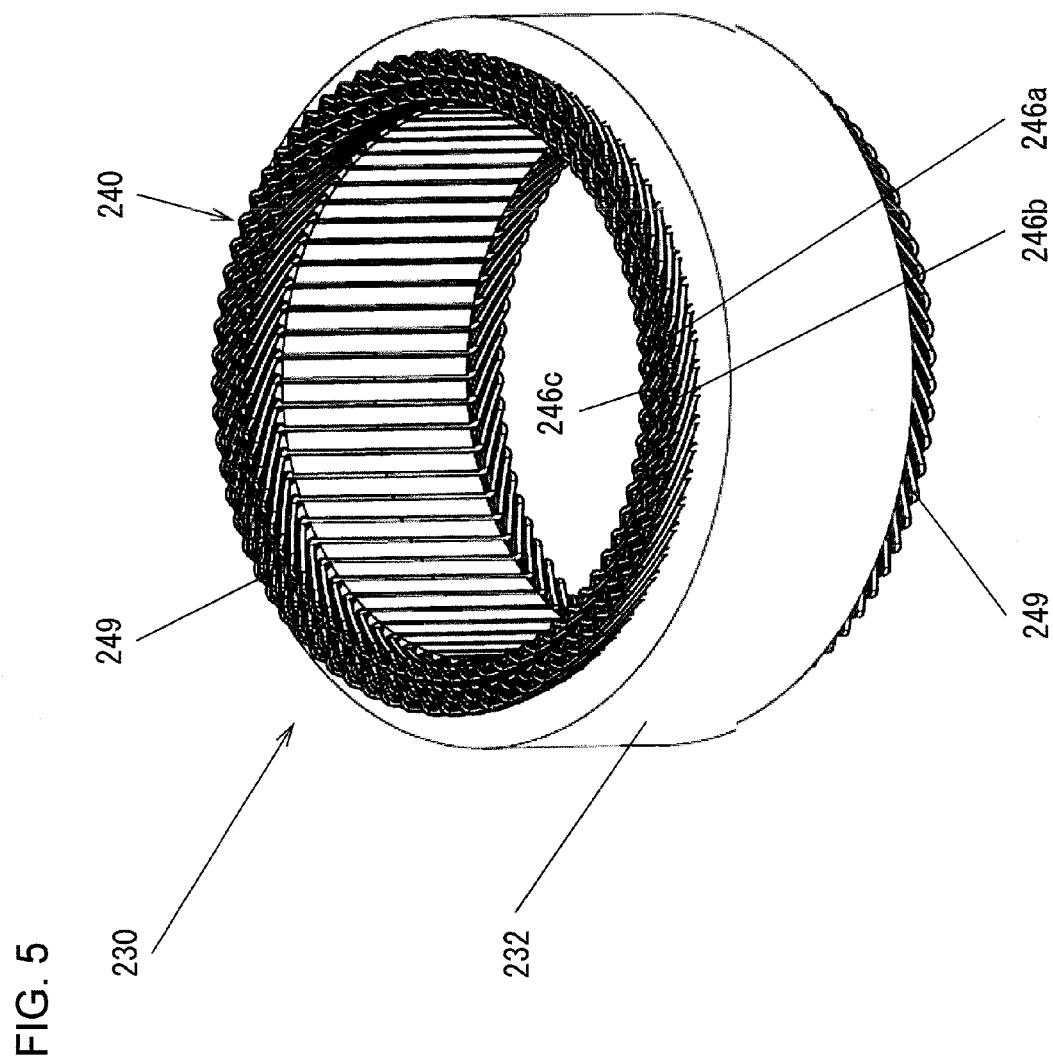

The stator 230 will be described in reference to FIGS. 3 through 5. FIG. 4 shows a stator core 232 in a sectional view and FIG. 5 is a perspective presenting an external view of the stator 230. As FIG. 3 shows, the stator 230 includes the stator core 232 assuming the shape of a circular cylinder and the stator winding 240 installed at the stator core 232.

(Stator core)

The stator core 232 is formed by laminating a plurality of ring-shaped electromagnetic steel sheets with a small thickness. The thickness of the electromagnetic steel sheets used to form the stator core 232 should be approximately 0.05 to 1.0 mm and such electromagnetic steel sheets may be formed through stamping or through etching.

As shown in FIGS. 4 and 5, a plurality of half-closed slots 236 and a plurality of teeth 238, ranging parallel to the axis of the stator core 232, are formed on the inner circumferential side of the stator core 232 over equal intervals along the circumferential direction. In the embodiment, 48 slots 236 are formed and a plurality of phase windings, corresponding to the U phase, the V phase and the W phase, which constitute the stator winding 240, are lap-wound through the various slots 236.

(Stator Winding)

Figure 6:
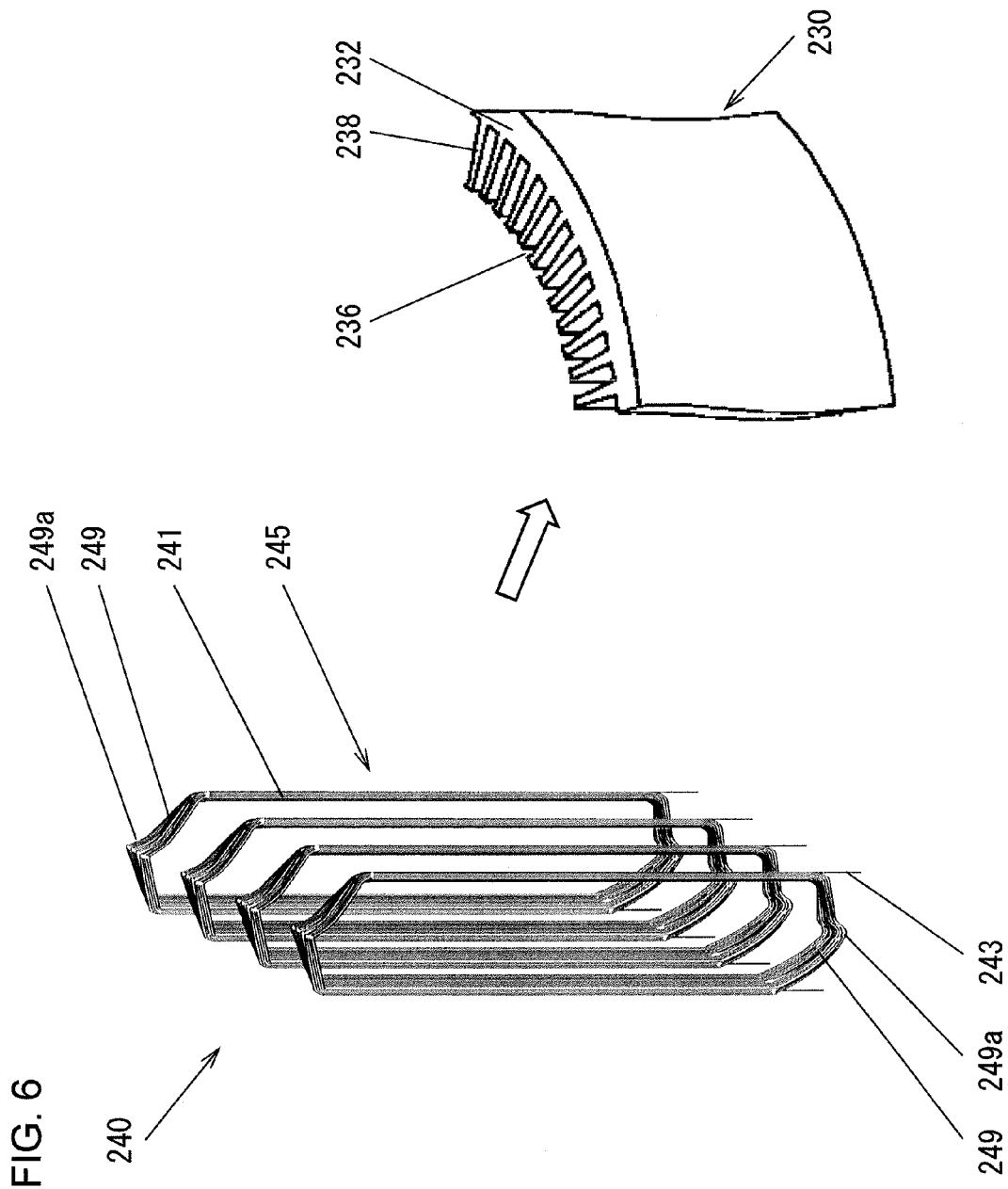

FIG. 6 is a perspective presenting an external view of lap-wound coils 245 and the stator core 232. As FIG. 6 indicates, the stator winding 240 includes a plurality of lap-wound coils 245. The lap-wound coils 245 are each formed by continuously winding a conductor wire 243 over two to several tens of turns. Each lap-wound coil 245 includes coil sides 241, which are portions extending along a straight line set inside slots 236 in the stator 230 and coil ends 249 cresting toward the outside of the slots 236 from the two ends of the stator core 232. Thus the lap-wound coil assumes an overall hexagonal shape.

It is to be noted that a coil side 241 is formed with a plurality of strands of the conductor wire 243 and thus, the cross-section of the coil side 241 is equivalent to a total of the cross-sections of the plurality of conductor wire strands (coil bundle).

The coil ends 249 of the lap-wound coil 245 are bent so that one of the pair of coil sides 241 thereof can be inserted at a specific slot 236 of the stator 230 further inside along the radial direction and that the other coil side 241 thereof can be inserted at another slot 236 further outside along the radial direction. The coil ends 249 of the lap-wound coil 245 bent as described above form crowning portions 249*a* with a predetermined bending radius.

It is to be noted that the slot at which one of the coil sides 241 of a given lap-wound coil 245 is inserted and the slot at which the other coil side 241 of the same lap-wound coil 245 is inserted are set apart from each other by 3 pitches in the embodiment, as will be described in detail later.

The crowning portions 249*a* with the predetermined bending radius are formed at the coil ends 249 at the stator achieved in the embodiment by using the hexagonal lap-wound coils (or diamond coils) 245. This means that it is crucial that the bending radius at the crowning portions 249*a* be minimized in order to minimize the extent to which the coil ends 249 distend from the stator core 232 along the axial direction. In the embodiment of the present invention, the stator winding 240 is divided into a plurality of winding groups and these winding groups are disposed in a plurality of layers set next to each other along the radial direction at the stator core 232. This structure allows the coil sides 241 of the lap-wound coils 245 to assume a smaller sectional area, which, in turn, makes it possible to reduce the bending radius of the crowning portions 249a. As a result, the lengths of the coil ends 249 distending from the stator core 232 can be minimized.

A structural example of the stator winding 240 constituted with three winding groups each made up with coils corresponding to the U-phase, the V-phase and the W-phase disposed to form a layer, will be described below.

Figure 7:
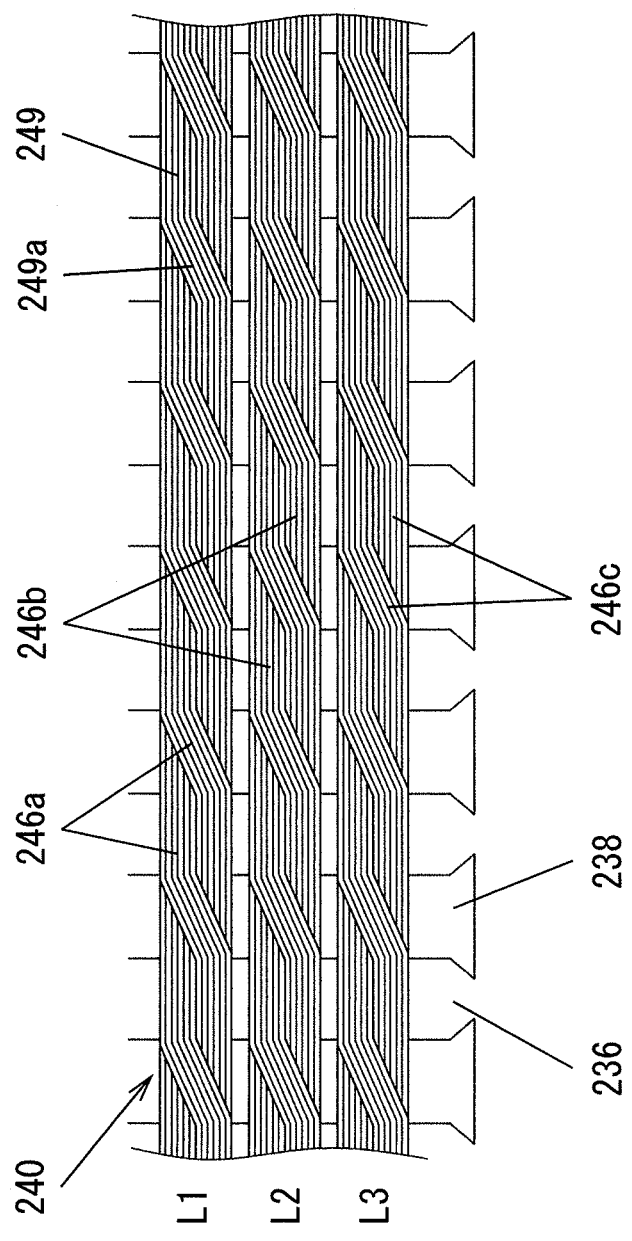

FIG. 7 shows a schematic linear development of the cylindrical stator core 232 in a view of the stator winding 240 installed in the stator core 232, taken from the side where crowning portions 249a are present. The stator winding 240 achieved in the embodiment is made up with a first winding group 246a, a second winding group 246b and a third winding group 246c, which are disposed over three layers set next to each other along the radial direction at the stator core 232, as shown in FIGS. 5 and 7.

It is to be noted that the space in which the first widening group 246a is wound will be referred to as a first layer L1, the space in which the second winding group 246b is wound will be referred to as a second layer L2 and the space in which the third winding group 246c is wound will be referred to as a third layer L3 in the description. They will be explained in detail later.

(Wiring Method Adopted for the Stator Winding)

FIG. 8 is a connection diagram illustrating how the stator windings 240 are wired. The stator winding 240 is constituted with phase windings corresponding to a total of three phases (U, V and W). The phase windings are arrayed with optimal intervals from one another, which are created via the slots 236. As FIG. 8 indicates, the phase windings corresponding to the three phases are each constituted with three coil windings. Namely, the U phase winding includes a coil winding U1, a coil winding U2 and a coil winding U3, and the V phase winding includes a coil winding V1, a coil winding V2 and a coil winding V3. The W phase winding includes a coil winding W1, a coil winding W2, and a coil winding W3.

As schematically illustrated by using the boldest lines in FIG. 8, the coil windings U1, V1 and W1 have coil sides 241 with the largest sectional area, i.e., the overall sectional area of the bundle of the plurality of conductor wires 243 is the largest at the coil windings U1, V1 and W1. As schematically indicated with the second boldest lines, the sectional area of the coil sides 241 of the coil windings U2, V2 and W2 is smaller than the sectional area of the coil sides 241 of the coil windings U1, V1 and W1 but larger than the sectional area of the coil sides 241 at the coil windings U3, V3 and W3. The sectional area of the coil sides 241 at the coil windings U3, V3 and W3 is the smallest of all. The sectional area of a coil side 241 can be altered by adjusting the number of turns with which the conductor wire 243 is wound. The alteration of the sectional area from one coil winding to another will be described in detail later.

Lead wires are drawn out from the individual phases, i.e., the U phase, the V phase and the W phase. The lead wires are each connected with the power conversion device 600 described earlier.

It is to be noted that the first winding group 246a, the second winding group 246b and the third winding group 246c, all shown in FIG. 7, are formed respectively by integrating the coil windings U1, V1 and W1 corresponding to the U phase, the V phase and the W phase, integrating the coil windings U2, V2 and W2 corresponding to the U phase, the V phase and the W phase, and integrating the coil windings U3, V3 and W3 corresponding to the U phase, the V phase and the W phase.

The U phase coil windings U1 through U3 will be first described in detail.

Figure 10:
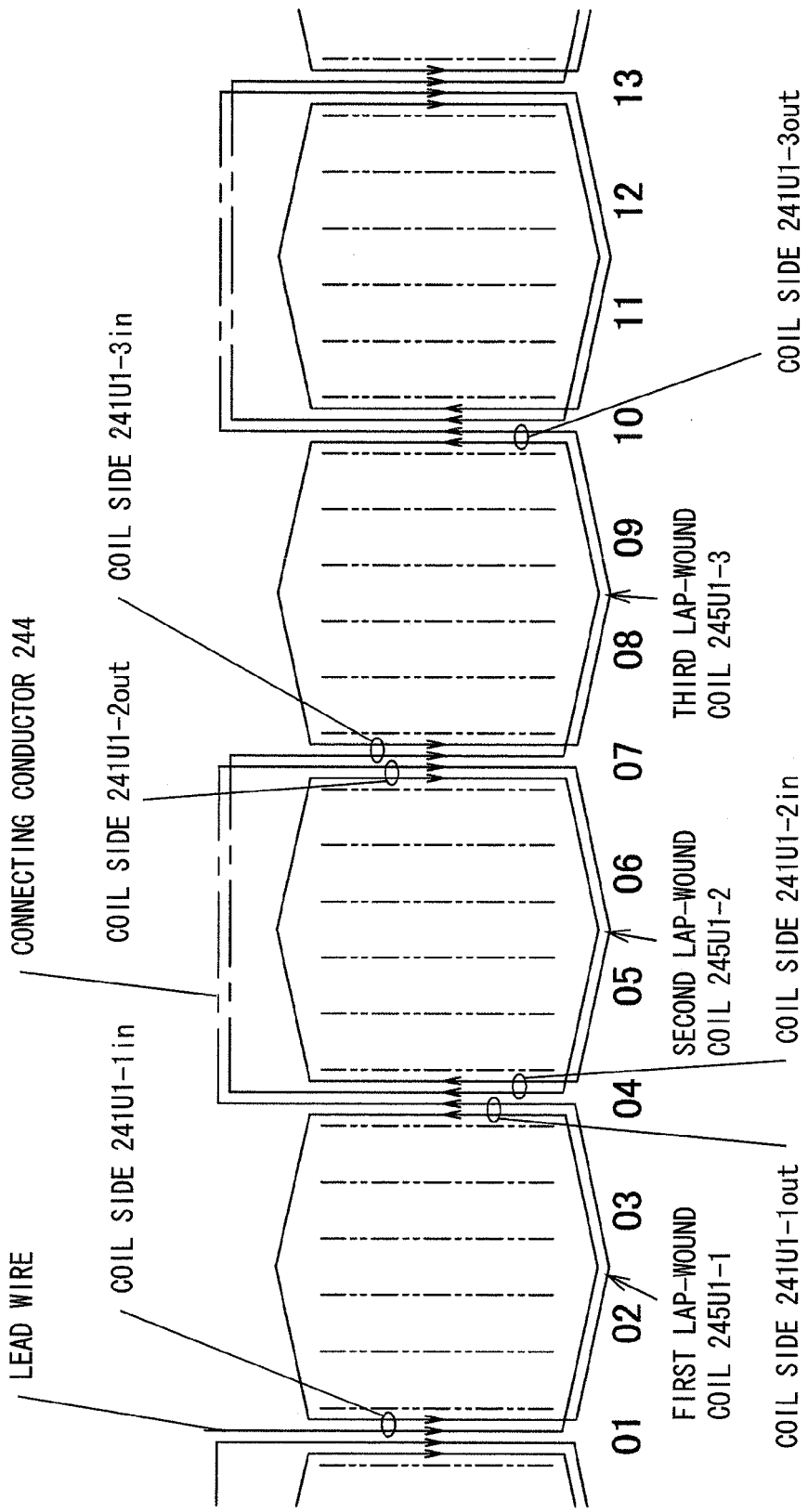
Figure 11:
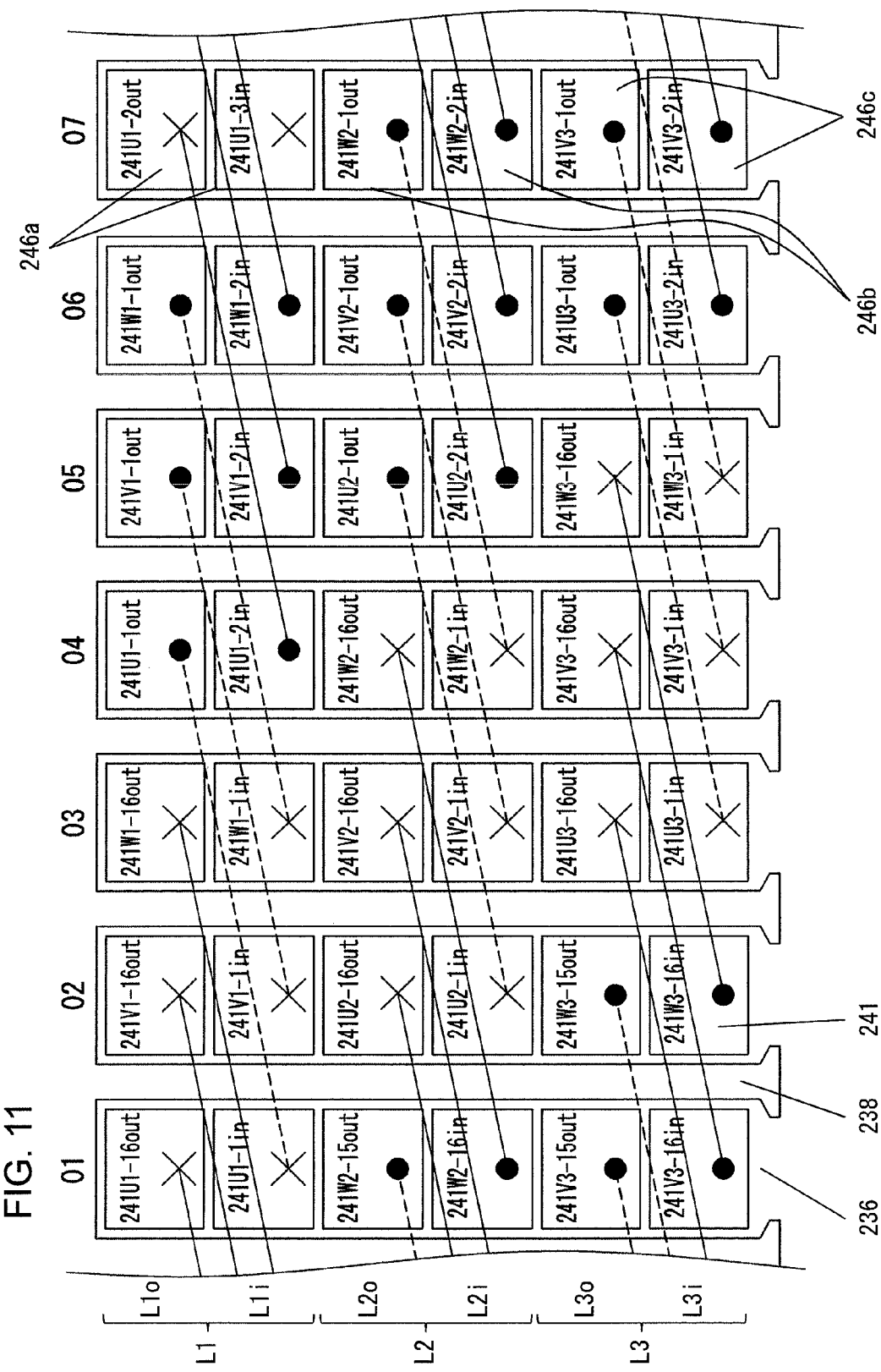
Figure 12:
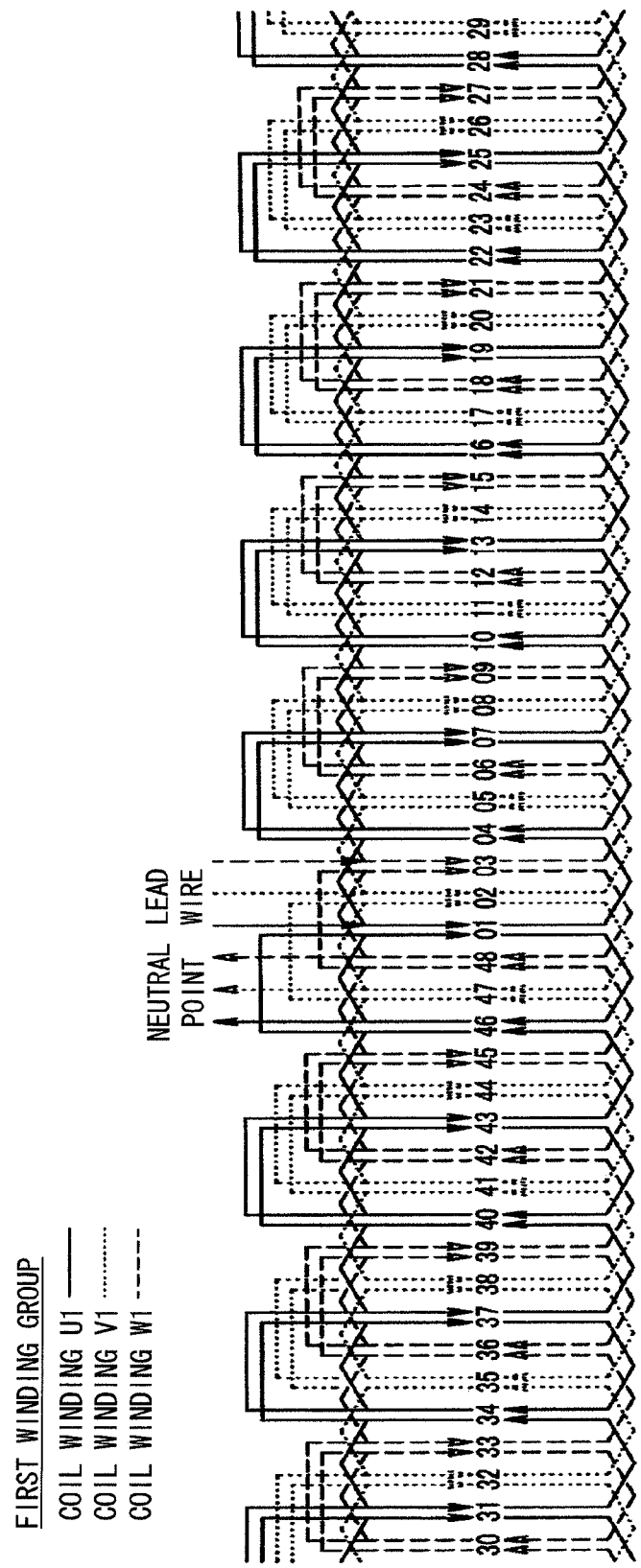

FIG. 9 shows the wiring in the U phase winding in detail, with FIG. 9(a) showing the coil winding U1 in the U phase winding and FIG. 9(b) showing the coil winding U2 in the U-phase winding. The coil winding U3 in the U-phase winding is shown in FIG. 9(c). Reference numerals 01, 02 through 47 and 48 in the figure denote slot numbers. In FIG. 9, each lap-wound coil 245 adjacent to another lap-wound coil 245 is rendered distinguishable by alternately using dotted lines and solid lines, with a connecting conductor 244 connecting adjacent lap-wound coils 245 indicated with a one-point chain line. FIG. 10 provides an enlarged view corresponding to slot numbers 01 through 13 in FIG. 9(a). FIG. 11 shows the positions of the coil sides 241 taken at the stator core 232 in correspondence to the coil windings inserted at the slots assigned with slot numbers 01 through 07. FIG. 12 shows the first winding group 246a.

In FIG. 11, reference numeral "241" indicating a coil side 241, a letter "U", "V" or "W" indicating the U-phase, the V-phase or the W-phase, "1", "2" or "3" indicating the layer number, a numeral among 1 through 16 indicating the number assigned to the corresponding lap-wound coil 245 and the notation "out" or "in" indicating whether the particular coil side is set on the outside or the inside of the corresponding layer are entered in the rectangular frame schematically representing the coil side 241. It is to be noted that the notations U1 through U3, V1 through V3 and W1 through W3, each made up with the letter indicating a specific phase combined with the layer number, each indicate a specific phase coil winding disposed in a specific layer. In addition, either a cross mark "x" indicating the direction of an electric current flowing from one coil end toward the opposite coil end or a filled circle mark "•" indicating the reverse direction is entered in each rectangular frame.

As shown in FIG. 11, three coil side insertion spaces L1 to L3 are defined, starting from the outer circumferential side and moving further toward the inner circumferential side, in each slot 236, and two coil sides 241 are set side-by-side along the radial direction in each of the coil side insertion spaces L1 through L3 in the embodiment.

In the following description, the coil side insertion spaces L1 through L3 will be referred to as a first layer L1, a second layer L2 and a third layer L3. The first layer L1 includes a first outside housing portion L1o and a first inside housing portion L1i, whereas the second layer L2 includes a second outside housing portion L2o and a second inside housing portion L2i. The third layer L3 includes a third outside housing portion L3o and a third inside housing portion L3. The coil sides 241 belonging to the first winding group 246a are housed in the first layer L1, the coil sides 241 belonging to the second winding group 246b are housed in the second layer L2, and the coil sides 241 belonging to the third winding group 246c are housed in the third layer L3.

It is to be noted that while the sectional areas of the coil sides 241 housed in the first layer L1, the second layer L2 and the third layer L3 vary from one layer to another as will be explained later, the coil sides 241 are all indicated by identical rectangular frames in the schematic representation provided in the figure.

As FIG. 9(a) indicates, the sixteen lap-wound coils 245 constituting the coil winding U1 are wound with three-slot coil pitches. As FIG. 10 and FIG. 11 illustrate, one of the two coil sides belonging to each lap-wound coil 245 in the coil winding U1 is inserted in the first inside housing portion L1i at a specific slot 236 in the first layer L1 and the other coil side 241 belonging to the same lap-wound coil 245 is inserted in the first outside housing portion L1o at another slot 236 in the first layer L1.

As shown in FIG. 9(a), FIG. 10 and FIG. 11, a coil side 241U1-1in belonging to the lap-wound coil 245U1-1 at the U-phase winding start is inserted in the first inside housing portion L1i in the first layer L1 at the slot assigned with slot number 01 and the other coil side 241U1-1out belonging to the lap-wound coil 245U1-1 is inserted in the first outside housing portion L1o at the slot assigned with slot number 04. One of the coil sides, i.e., the coil side 241U1-2in, belonging to the next U-phase lap-wound coil 245U1-2 is inserted in the first inside housing portion L1i in the first layer L1 at the slot assigned with slot number 04, whereas its other coil side 241U1-2out is inserted in the first outside housing portion L1o at the slot assigned with slot number 07. One of the coil sides, i.e., the coil side 241U1-3in, belonging to the next U-phase lap-wound coil 245U1-3 is inserted in the first inside housing portion L1i in the first layer L1 at the slot assigned with slot number 07, whereas its other coil side 241U1-3out is inserted in the first outside housing portion L1o at the slot assigned with slot number 10. The conductor extending out of the slot from the coil side 241U1-1out and the conductor extending out of the slot from the coil side 241U1-2out are connected with each other via a connecting conductor 244, and the conductor extending out of the slot from the coil side 241U1-2in and the conductor extending out of the slot from the coil side 241U1-3in are connected with each other via a connecting conductor 244. By reiterating this pattern, the sixteen lap-wound coils 245 constituting the coil winding U1 are wound so as to form a full circle at the stator core 232.

As FIG. 9(b) and FIG. 11 illustrate, the sixteen lap-wound coils 245 constituting the coil winding U2, too, are wound so as to form a full circle at the stator core 232, with a one-slot offset relative to the coil winding U1. As FIG. 9(c) and FIG. 11 illustrate, the sixteen lap-wound coils 245 constituting the coil winding U3 are also wound so as to form a full circle at the stator core 232, with a one-slot offset relative to the coil winding U2. The one-slot offset with which the coil winding U2 is wound relative to the coil winding U1 generates a phase difference equivalent to the electric angle corresponding to one slot. The coil winding U3, too, is wound with a one slot offset relative to the coil winding U2, thereby creating a phase difference equivalent to the electric angle corresponding to one slot.

The V-phase winding and the W-phase winding are likewise wound at the stator core 232. As FIG. 11 and FIG. 12 indicate, the sixteen lap-wound coils 245 constituting the coil winding V1 in the V-phase winding are wound at the stator core 232 so that they are inserted in the first layer L1 with a one slot offset relative to the coil winding U1 in the U-phase winding. The sixteen lap-wound coils 245 constituting the coil winding W1 in the W-phase winding are wound at the stator core 232 so that they are inserted in the first layer L1 with a one slot offset relative to the coil winding V1 in the V-phase winding.

The coil winding V2 in the V-phase winding and the coil winding W2 in the W-phase winding are wound likewise, so that they are inserted in the second layer L2 in a similar manner, and the coil winding V3 in the V-phase winding and the coil winding W3 in the W-phase winding are wound so that they are inserted in the third layer L3 in a similar manner.

In the layered configuration of the three winding groups described above, six coil sides 241 are inserted in each slot. For instance, at the slot 236 assigned with slot number 04, one coil side 241U1-1out belonging to the first U-phase lap-wound coil 245u1-1 and one coil side 241U1-2in belonging to the second lap-wound coil 245u1-2 are inserted in the first layer L1, i.e., one of the coil side insertion spaces, as shown in FIG. 11. In the second layer L2 at the same slot 236, one coil side 241W2-16out belonging to the sixteenth lap-wound coil 245W2-16 in the coil winding W2 and one coil side 241W2-1in belonging to the first lap-wound coil 245W2-1 are inserted. In addition, in the third layer L3 at the same slot 236, one coil side 241V3-16out belonging to the sixteenth lap-wound coil 245V3-16 in the V-phase winding and a coil side 241V3-1in belonging to the first lap-wound coil 245V3-1 are inserted.

As described above, the stator winding 240 achieved in the embodiment is installed in the slots 236 at the stator core 232 by adopting a multilayer lap winding method. The stator winding 240 includes the first winding group 246a disposed in the first layer L1, the second winding group 246b disposed in the second layer L2 and the third winding group 246c disposed in the third layer L3.

The first winding group 246a is made up with the U-phase coil winding U1, the V-phase coil winding V1 and the W-phase coil winding W1, and the coil windings U1, V1 and W1 each include sixteen lap-wound coils 245. Namely, the first winding group 246a is made up with forty eight lap-wound coils 245. Likewise, the second winding group 246b, comprising the U-phase coil winding U2, the V-phase coil winding V2 and the W-phase coil winding W2, is made up with forty eight lap-wound coils 245. The third winding group 246c, comprising the U-phase coil winding U3, the V-phase coil winding V3 and the W-phase coil winding W3, is also made up with forty eight lap-wound coils 245.

Figure 13:
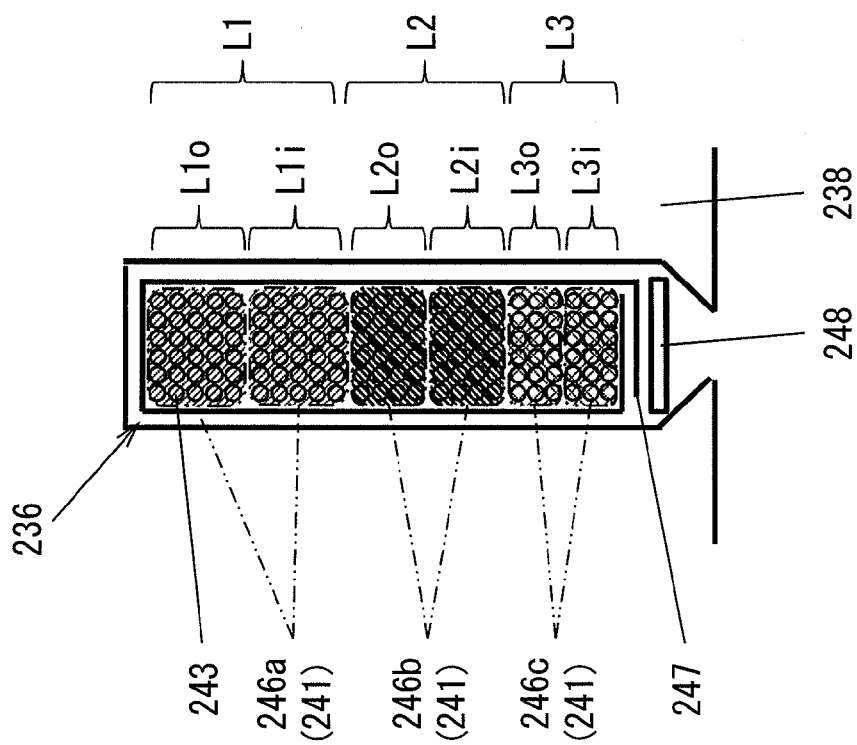
Figure 14:
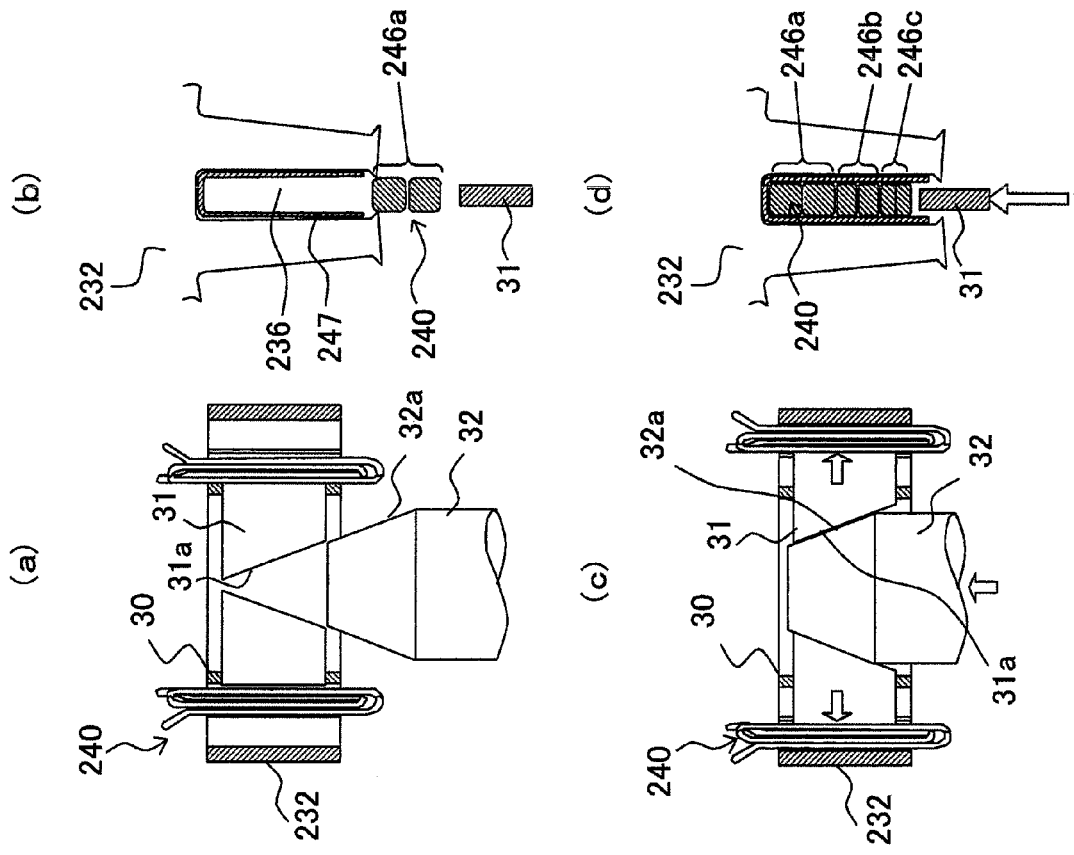

In the embodiment, the first winding group 246a, the second winding group 246b and the third winding group 246c assume varying sectional areas at their coil sides 241. FIG. 13 presents an enlarged view of the coil sides 241 inserted in a slot 236 at the stator 230 achieved in the embodiment of the present invention. As shown in FIG. 13, coil sides 241, each formed with a bundle of conductor wires 243 are inserted in a slot 236 ranging along the axial direction. It is to be noted that while each coil side 241 is made up with a plurality of conductor wires 243, the section of the coil side 241 is schematically represented as a two-point chain line rectangle in the figure.

While the sectional areas of the conductor wires 243 forming the coil sides 241 in the various winding groups 246a, 246b and 246c in the embodiment are uniform, the conductor wires 243 are wound with varying numbers of turns in the individual winding groups 246a, 246b and 246c so as to alter the sectional area of the coil sides 241 from one winding group to another.

In the embodiment, the hexagonal lap-wound coils 245 shown in FIG. 6 are used, and accordingly, the number of turns at the lap-wound coils 245 forming the first winding group 246a is set greater than the number of turns at the lap-wound coils 245 forming the second winding group 246b and the number of turns at the lap-wound coils 245 forming the second winding group 246b is set greater than the number of turns at the lap-wound coils 245 forming the third winding group 246c. In this manner, the sum of the sectional areas of the plurality of coil sides 241, belonging to the winding groups 246a through 246c located in the first through third layers set next to each other starting from the outer circumferential side and moving further toward the inner circumferential side, which are inserted through a given slot, as described above, achieves a design value.

It is to be noted that for purposes of insulation, a slot liner (or slot insulator) 247 is fitted in each of the slots 236 at the stator core 232 as shown in FIG. 13. In addition, a plug 248 is disposed near the slot opening in order to prevent the stator winding 240 from slipping out of the slot 236.

The procedural steps through which the first winding group 246a through the third winding group 236c described above are installed at the stator core 232 will be explained next.

The various winding groups 246a, 246b and 246c are fitted into the first layer L1, the second layer L2 and the third layer L3 at the slots 236 in sequence, by inserting them through the slots 236 from the inside at the stator core 232. In more specific terms, the first winding group 246a (see FIGS. 5 and 7 for its overall configuration and see FIG. 12 for its wiring details) made up with the sixteen lap-wound coils 245 constituting the U-phase coil winding U1, the sixteen lap-wound coils 245 constituting the V-phase coil winding V1 and the sixteen lap-wound coils 245 constituting the W-phase coil winding W1 is fitted into the first layer L1 at the slots 236. Next, the second winding group 246b, made up with the sixteen lap-wound coils 245 constituting the U-phase coil winding U2, the sixteen lap-wound coils 245 constituting the V-phase coil winding V2 and the sixteen lap-wound coils 245 constituting the W-phase coil winding W2 is fitted into the second layer L2 at the slots 236. Lastly, the third winding group 246c, made up with the sixteen lap-wound coils 245 constituting the U-phase coil winding U3, the sixteen lap-wound coils 245 constituting the V-phase coil winding V3 and the sixteen lap-wound coils 245 constituting the W-phase coil winding W3 is fitted into the third layer L3 at the slots 236.

(Stator Winding Installation Method)

The method adopted when installing the stator winding 240 at the stator core 232 by using an open forming jig 30 will be described next. The first winding group 246a is set, together with the stator core 232, at the open forming jig 30, as shown in FIG. 14(a). FIG. 14(b) provides an enlarged view of a slot 236 at the stator core 232 in the state shown in FIG. 14(a). The slots 236 are already lined with the slot insulator 247.

As shown in FIG. 14(b), the open forming jig 30 includes blades 31 used to push the first winding group 246a having been set at the open forming jig 30 toward the slots 236 from the open forming jig 30. The number of blades 31 at the open forming jig 30 matches the number of slots 236 formed at the stator core 232. The blades 31 each include a tapered portion 31a, as shown in FIG. 14(a). A pressure-applying rod 32 is disposed at the bottom of each blade 31 and a tapered portion 32a, which presses against the tapered portion 31a of the blade 31, is formed at the pressure-applying rod 32.

As shown in FIG. 14(c), as the pressure-applying rod 32 is moved upward in the figure, the tapered portion 32a of the pressure-applying rod 32 is pressed against the tapered portion 31a of the blade 31, causing displacement of the blade 31 toward the outer circumference of the stator core 232. As a result, the coil sides 241 belonging to the first winding group 246a become inserted through the slots 236 at the stator core 232. Once the installation of the first winding group 246a is completed, the second winding group 246b and the third winding group 246c are inserted through the slots 236 in a similar manner, and thus, the first through third winding groups 246a through 246c are all installed at the stator core 232, as shown in FIG. 14(d).

The following advantages are achieved through the embodiment described above.

(1) The stator winding 240 is configured with a plurality of winding groups 246a, 246b and 246c, and the various winding groups 246a, 246b and 246c are installed at the stator core 232 over a plurality of layers. This configuration allows the sectional area of the coil sides 241 in the lap-wound coils 245 constituting the stator winding 240 to be reduced, in comparison to that at a single-layer lap-wound stator configured by installing a single-layer stator winding 240 at a stator core 232, and thus, the bending radius at the crowning portions 249a at the coil ends 249, too, can be reduced. This, in turn, makes it possible to reduce the size of the coil ends 249 compared to the size of the coil ends at the single layer lap-wound stator and ultimately makes it possible to provide a more compact rotating electric machine 200.

Figure 15:
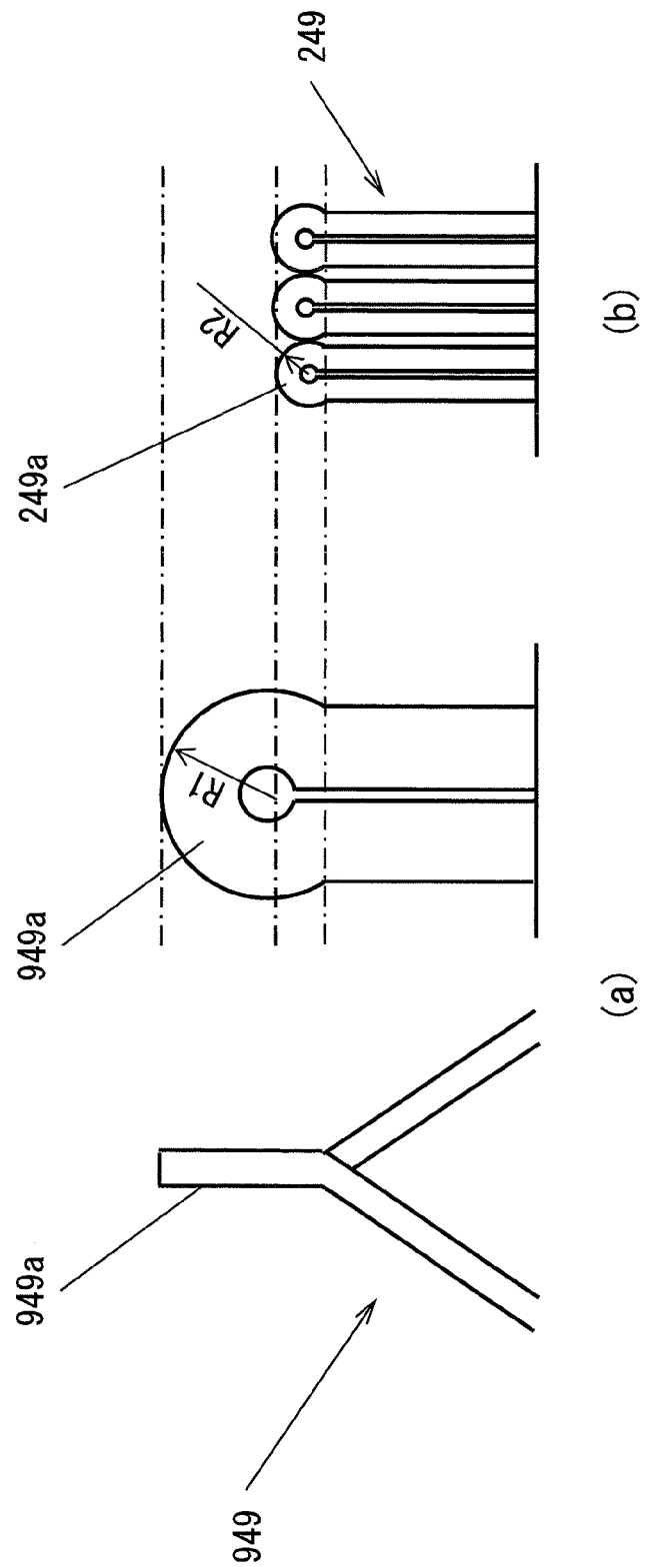

The benefits resulting from the layered configuration of the stator winding 240 will be explained in more specific terms in reference to FIG. 15. FIG. 15(a) is a schematic enlarged view of a crowning portion 949a at a coil end 949 of a stator winding representing an example of the related art, whereas FIG. 15(b) is an enlarged schematic view of crowning portions 249a at a coil end 249 in the stator winding 240 achieved in the embodiment of the present invention.

As shown in FIG. 15(a), the stator winding in the example of the related art does not adopt a multilayer configuration and thus, the sectional area of the coil sides is set to the required value by either using lap-wound coils constituted with a thick conductor wire with a large wire diameter or by using lap-wound coils wound with a large number of turns. For this reason, the bending radius R1 at the crowning portion 949a is bound to be large.

In contrast to the example of the related art, the stator winding 240 at the stator 230 achieved in the embodiment is installed at the stator core 232 in the form of three separate winding groups inserted in a multilayer configuration. This means that the sectional areas of the individual coil sides 241 inserted in the slots 236 in correspondence to the various winding groups can be reduced in the embodiment in comparison to the sectional area of the coil sides in the related art. As a result, the bending radius R2 of each crowning portion 249a at the coil end 249 can be set smaller than the bending radius R1 of the crowning portion 949a at the coil end 949 in the example of the related art, making it possible to minimize the extent to which the coil end 249 distends out along the axial direction. It is to be noted that since the sectional area at the coil sides 241 changes from one layer to another, the bending radius at the crowning portion 249a, too, changes from one layer to another in the embodiment.

(2) The rigidity at the coil sides 241 with smaller sectional areas in the stator winding 240 achieved in the embodiment of the present invention is lower. This means that the stator winding 240 can be inserted with better ease. More specifically, in the example of related art, the sectional area at the coil sides in the stator winding is larger and thus the rigidity at the coil sides is also greater. For this reason, as the coil sides are inserted through the slots 236, a significant force of repulsion, acting in the direction along which the coil sides are pushed away from the slots 236, occurs. As a result, the coil sides cannot be smoothly inserted in the slots 236, making it difficult to push the conductor wires to the deepest ends of the slots 236.

In contrast, the coil sides 241 in each winding group constituting part of the stator winding 240 achieved in the embodiment have a smaller sectional area and thus assume a lower level of rigidity. Consequently, the coil sides 241 can be smoothly inserted through the slots 236. In addition, since the conductor wires 243 can be pushed to the deepest ends of the slots 236 with ease, an improvement in the space factor (or space fill rate) of the conductor wires 243 is achieved. As a result, a compact and highly efficient rotating electric machine 200 assuring superior productivity can be provided.

(3) The sectional area of the coil sides 241 disposed in the second layer L2 is set smaller compared to the sectional area of the coil sides 241 disposed in the first layer L1, and the sectional area of the coil sides 241 disposed in the third layer L3 is set smaller than the sectional area of the coil sides 241 disposed in the second layer L2. In other words, the smaller sectional area is assumed for coil sides 241 that are inserted later. Through these measures, it is ensured that the conductor wires 243 can be pressed into the slots 236 with even higher density, achieving a further improvement in the space factor.

(4) The stator winding 240 is installed in the stator core 232 so that the phase of the electric current flowing through the second winding group 246b disposed in the second layer L2 is offset by an extent equivalent to one slot relative to the phase of the electric current flowing through the first winding group 246a disposed in the first layer L1. In addition, the stator winding 240 is installed in the stator core 232 so that the phase of the electric current flowing through the third winding group 246c disposed in the third layer L3 is offset by an extent equivalent to one slot relative to the phase of the electric current flowing through the second winding group 246b disposed in the second layer L2. The extent of torque ripple occurring at the stator core 232 with the first through third winding groups 246a, 246b and 246c constituting the stator winding 240 installed thereat with the phase of each winding group offset by one slot relative to the next winding group, as described above, can be lessened, which, in turn, makes it possible to reduce the noise in the rotating electric machine 200.

Figure 16:
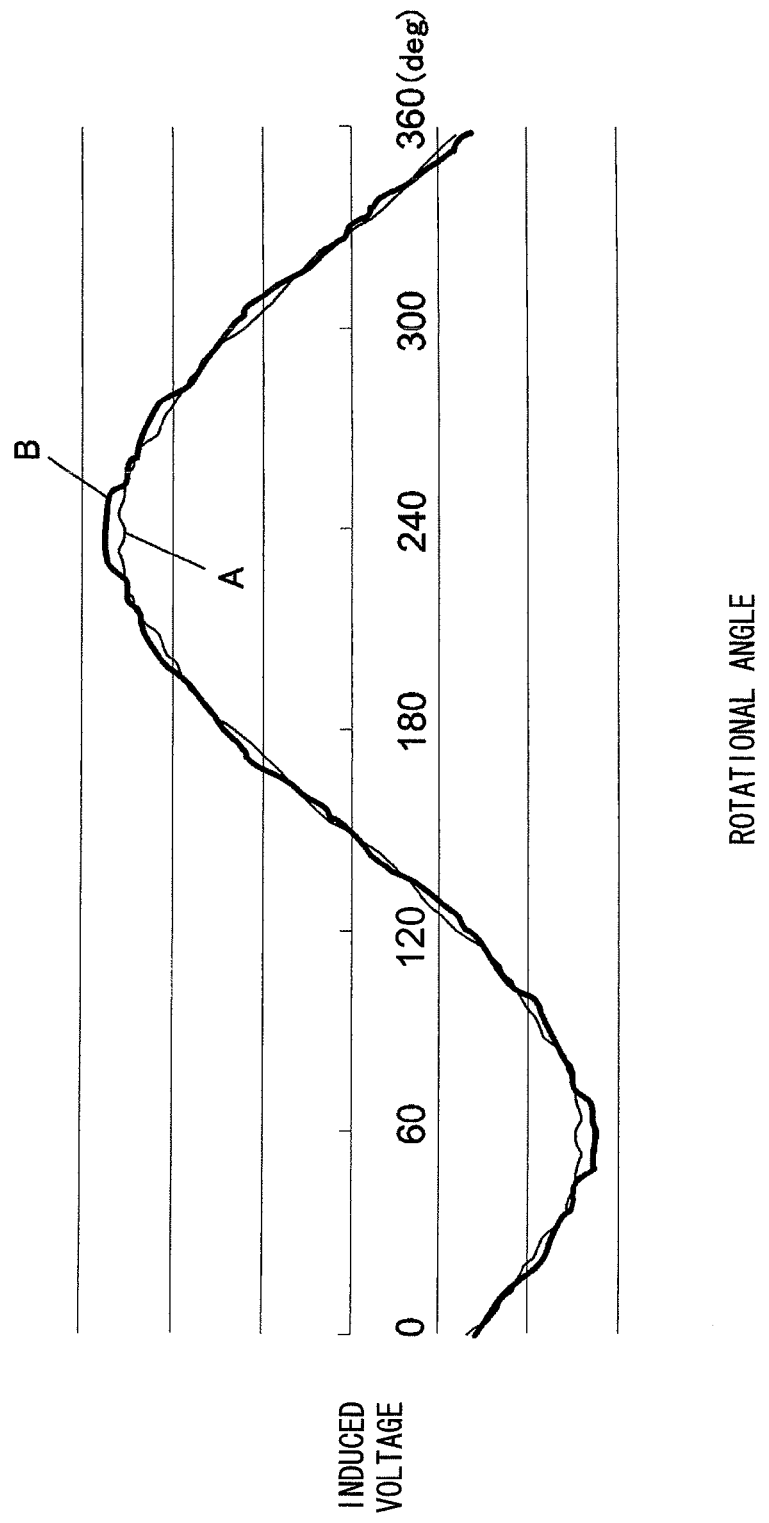

FIG. 16 is an induced voltage waveform diagram, with a curve A representing the waveform of the induced voltage in the rotating electric machine 200 achieved in the embodiment and a curve B representing the waveform of the induced voltage at a rotating electric machine in a comparison example, which includes a stator with a stator winding 240 installed at a stator core 232 without offsetting the current phases. FIG. 16 clearly indicates that the induced voltage waveform represented by the curve A more closely approximates a sine wave than the induced voltage waveform represented by the curve B.

By offsetting the phases of the electric currents flowing through the various winding groups by one slot at a time, as in the embodiment, a skew effect can be achieved without having to twist the stator core 232, having to split a permanent magnet 254 at the rotor 250 into separate magnet pieces along the axial direction and dispose the separate magnet pieces in a diagonal formation or the like.

The following variations are also within the scope of the present invention and a single variation or a plurality of variations may be adopted in combination with the embodiment described above.

Figure 17:
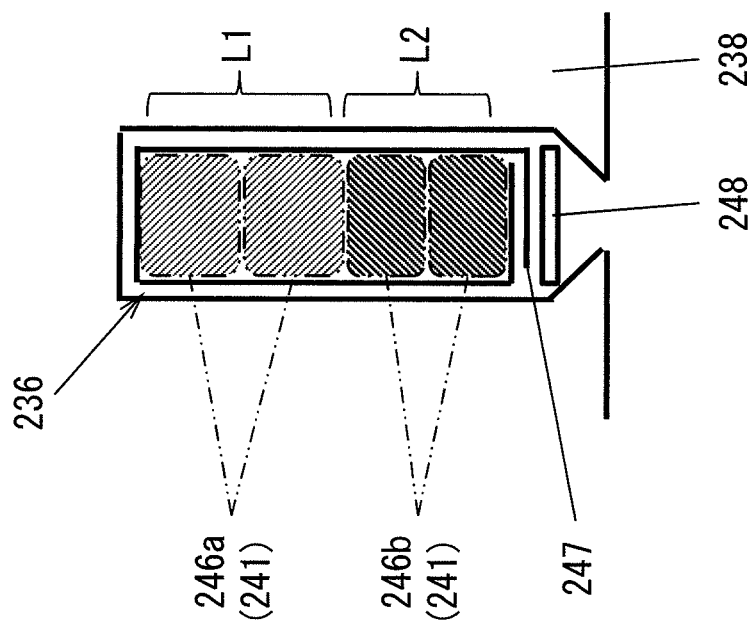

(1) The present invention is not limited to the configuration in which winding groups are disposed in separate layers, i.e., the first layer L1, the second layer L2 and the third layer L3. For instance, the stator 240 may include two separate winding groups (the first winding group 246a and the second winding group 246b) installed at the stator core 232 as shown in FIG. 17. As a further alternative, four or more winding groups may be disposed in separate layers.

Figure 18:
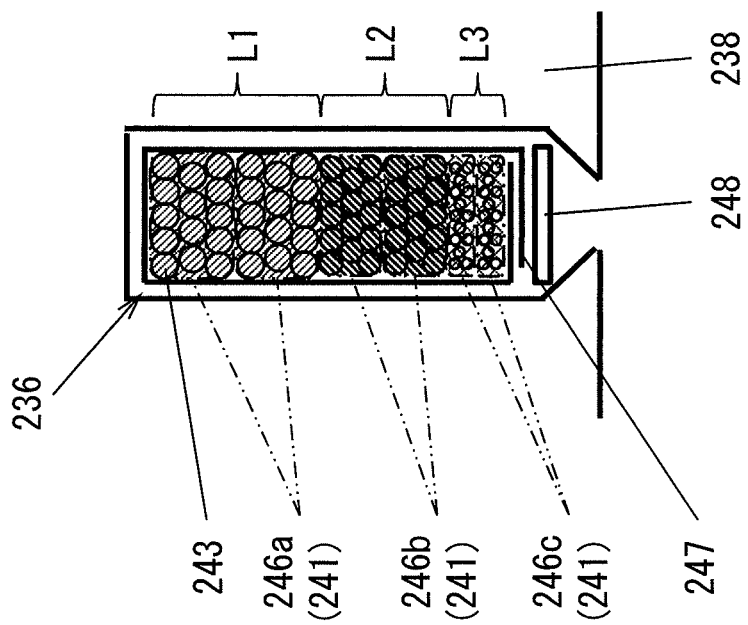

(2) The present invention is not limited to the example in which the number of turns with which the conductor wire 243 is wound is varied from one layer to another so as to achieve different sectional areas at the coil sides 241 from one layer to another. The sectional areas at the coil sides 240 may be varied from one layer to another without varying the number of turns from one layer to another by using conductor wires 243 with varying sectional areas to form the coil sides 241 in the individual layers as shown in FIG. 18, instead.

(3) The coil sides 241 inserted in the different layers may assume a uniform sectional area. The sectional area of the coil sides 241 belonging to the various winding groups in the stator winding 240 disposed in a plurality of layers is bound to be smaller than the sectional area of the coil sides in a single-layer stator winding 240 installed at a stator core 232. As a result, the size of the coil ends 249 will be reduced in this case, as well.

(4) While different sectional areas are achieved at the coil sides 241 in the various layers by setting a larger sectional area at the coil sides 241 in the lap-wound coils 245 disposed in an outer circumferential side layer at the stator core 232 relative to the sectional area at the coil sides 241 in the lap-wound coils 245 disposed in an inner circumferential side layer at the stator core 232 in the embodiment described earlier, the present invention is not limited to this example. For instance, the sectional area at the coil sides 241 disposed in the outer circumferential side layer may be set smaller than the sectional area at the coil sides 241 disposed in the inner circumferential side layer. Since the sectional area at the coil sides 241 disposed in each layer can be altered freely by adjusting the number of turns with which the conductor wire 243 are wound and/or by adjusting the sectional area of the conductor wire 243, the induced voltage waveform can be fine-adjusted.

(5) The sectional shape of the conductor wire 243 used to constitute the stator winding 240 does not need to be round, and the coil sides 241 may be formed by bundling strands of conductor wire 243 with a rectangular section.

(6) The rotating electric machine does not need to be a synchronous motor, and instead, the present invention may be adopted in an induction motor.

(7) The present invention is not limited to the configuration in which coil sides 241 are set in a single column along the radial direction, and instead, coil sides 241 may be set over two or more columns along the radial direction.

(8) The stator winding 240 may be wired through a method other than that described earlier.

(9) The lap-wound coils 245 may assume a shape other than that described earlier. In other words, the lap-wound coils 245 may be formed in any of various shapes as long as the shape allows one of the coil sides 241 to be disposed in a specific slot 236 on the inner side along the radial direction and allows the other coil side 241 to be disposed in another slot 236 on the outer side along the radial direction.

(10) The stator winding 240 does not need to be installed at the stator winding 232 by using the open forming jig 30. For instance, the lap-wound coils 245 may be manually installed at the slots 236. Since the sectional areas at the coil sides 241 are smaller and thus, the level of repulsive force at the coil sides 241 is lower, the conductor wires 243 can be pushed deeper into the slots 236 with ease by pushing the coil sides 241 inward by hand.

(11) The present invention is not limited to the example in which the stator winding 240 is installed at the stator core 232 by offsetting the phase of the winding group disposed in an inner circumferential side layer at the stator core 232 by an extent equivalent to one slot along the circumferential direction relative to the phase of the winding group disposed in the outer circumferential side layer at the stator core 232. In other words, winding groups may be mounted with a phase offset equivalent to two or more slots or they may be mounted without any phase offset.

While the present invention has been described in reference to an embodiment and variations thereof, the present invention is in no way limited to these examples as long as the features characterizing the present invention remain intact. Any other mode conceivable within the technical range of the present invention should, therefore, be considered to be within the scope of the present invention.

The disclosure of the following priority application is herein incorporated by reference:
Japanese Patent Application No. 2011-089191 filed Apr. 13, 2011

The invention claimed is:

1. A stator, comprising:
a stator core with N pieces of slots ranging along an axial direction, which are formed side-by-side along a circumferential direction; and
a stator winding installed in the slots at the stator winding, wherein:
the stator winding includes a plurality of winding groups, each made up with N pieces of lap-wound coils each formed by winding a conductor wire a plurality of times;
the winding groups are disposed in a plurality of layers set side-by-side along a radial direction at the stator core;
one coil side at each of the lap-wound coils is inserted in a specific slot on an inner side along the radial direction in a specific layer and another coil side of the lap-wound coil is inserted in another slot on an outer side along the radial direction in the specific layer, and
when the winding groups, each corresponding to different phases, are made up with n pieces of coil windings Ui, n pieces of coil windings Vi and n pieces of coil windings Wi (i=1~n), a total of the plurality of layers is n and the plurality of winding groups are notated as Lj (j=1~n), n pieces of winding groups Lj, each made up with a coil winding Ui, a coil winding Vi and a core winding Wi, are wound over the n layers, starting from an inner circumferential side toward an outer circumferential side at the stator core.

2. A stator according to claim 1, wherein:
a sectional area of coil sides in the lap-wound coils disposed in a specific layer at the stator core is different from a sectional area of coil sides in the lap-wound coils disposed in another layer different from the specific layer at the stator core.

3. A stator according to claim 1, wherein:
a number of turns with which the conductor wire forming the coil sides in the lap-wound coils disposed in the specific layer at the stator core is wound is different from a number of turns with which the conductor wire forming the coil sides in the lap-wound coils disposed in another layer different from the specific layer at the stator core is wound.

4. A stator according to claim 3, wherein:
the conductor wire assumes a uniform sectional area.

5. A stator according to claim 1, wherein:
a sectional area of the conductor wire forming the coil sides in the lap-wound coils disposed in the specific layer at the stator core is different from a sectional area of the conductor wire forming the coil sides in the lap-wound coils disposed in another layer different from the specific layer at the stator core.

6. A stator according to claim 5, wherein:
the conductor wire is wound with a uniform number of turns.

7. A stator according to claim 1, wherein:
a sectional area of the coil sides in the lap-wound coils disposed in an outer circumferential side layer at the stator core is larger than a sectional area of coil sides in the lap-wound coils disposed in an inner circumferential side layer at the stator core.

8. A stator according to claim 1, wherein:
the stator winding is installed at the stator core so that a phase of the lap-wound coils disposed in an inner circumferential side layer at the stator core is offset along the circumferential direction by an extent equivalent to one slot or more relative to the phase of the lap-wound coils disposed in an outer circumferential side layer at the stator core.

9. A rotating electric machine, comprising:
a stator including
a stator core with N pieces of slots ranging along an axial direction, which are formed side-by-side along a circumferential direction; and
a stator winding installed in the slots at the stator winding, wherein:
the stator winding includes a plurality of winding groups, each made up with N pieces of lap-wound coils each formed by winding a conductor wire a plurality of times;
the winding groups are disposed in a plurality of layers set side-by-side along a radial direction at the stator core; and
one coil side at each of the lap-wound coils is inserted in a specific slot on an inner side along the radial direction in a specific layer and another coil side of the lap-wound coil is inserted in another slot on an outer side along the radial direction in the specific layer;
a rotor rotatably disposed on an inner circumferential side of the stator with a gap setting the rotor apart from the stator, wherein:
the rotating electric machine is driven with three-phase AC power, and
when the winding groups, each corresponding to different phases, are made up with n pieces of coil windings Ui, n pieces of coil windings Vi and n pieces of coil windings Wi (i=1~n), a total of the plurality of layers is n and the plurality of winding groups are notated as Lj (j=1~n), n pieces of winding groups Lj, each made up with a coil winding Ui, a coil winding Vi and a core winding Wi, are wound over the n layers, starting from an inner circumferential side toward an outer circumferential side at the stator core.

10. A rotating electric machine according to claim 9, wherein:
N pieces of slots, each ranging along the axial direction, are formed side-by-side along the circumferential direction at the stator core;
the coil windings are each made up with N/n pieces of lap-wound coils, each formed by winding a conductor wire a plurality of times; and
one coil side of each lap-wound coil in a coil winding among the coil windings corresponding to the different phases in each winding group is inserted in a specific slot further inside along the radial direction in a specific layer and another coil side of the lap-wound coil is inserted in another slot further outside along the radial direction in the specific layer.

* * * * *